US011946227B2

(12) United States Patent
Nagao et al.

(10) Patent No.: US 11,946,227 B2
(45) Date of Patent: *Apr. 2, 2024

(54) WORKING MACHINE

(71) Applicant: KUBOTA CORPORATION, Osaka (JP)

(72) Inventors: Kohei Nagao, Osaka (JP); Yuji Fukuda, Osaka (JP); Ryota Hamamoto, Osaka (JP); Hiroaki Nakagawa, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 376 days.

This patent is subject to a terminal disclaimer.

(21) Appl. No.: 17/360,339

(22) Filed: Jun. 28, 2021

(65) Prior Publication Data

US 2022/0049458 A1 Feb. 17, 2022

(30) Foreign Application Priority Data

Aug. 15, 2020 (JP) .................................. 2020-137174
May 21, 2021 (JP) .................................. 2021-086100

(51) Int. Cl.
*E02F 9/22* (2006.01)
*B62D 11/00* (2006.01)
*B62D 11/04* (2006.01)
*F15B 15/22* (2006.01)
*E02F 3/34* (2006.01)
*E02F 9/20* (2006.01)

(52) U.S. Cl.
CPC ............ *E02F 9/225* (2013.01); *B62D 11/005* (2013.01); *B62D 11/04* (2013.01); *E02F 9/2235* (2013.01); *E02F 9/2253* (2013.01); *F15B 15/22* (2013.01); *E02F 3/3414* (2013.01); *E02F 9/2004* (2013.01); *E02F 9/2275* (2013.01); *E02F 9/2285* (2013.01); *E02F 9/2292* (2013.01); *E02F 9/2296* (2013.01)

(58) Field of Classification Search
CPC ...... F15B 15/22; F16D 2121/02; F16H 61/14; F16H 61/1457; F16H 61/44; F16H 61/456; E02F 9/22; E02F 9/2235; E02F 9/225; E02F 9/2253; E02F 9/2296; B62D 11/00; B62D 11/005; B62D 11/04
See application file for complete search history.

(56) References Cited

U.S. PATENT DOCUMENTS

| | | | | |
|---|---|---|---|---|
| 4,495,767 A | * | 1/1985 | Akiyama | B60W 10/10 60/435 |
| 9,316,310 B2 | * | 4/2016 | Kinugawa | F16H 61/468 |
| 2010/0236233 A1 | * | 9/2010 | Sumiyoshi | E02F 9/2232 60/468 |
| 2016/0230370 A1 | * | 8/2016 | Fukuda | F16H 61/4008 |
| 2020/0318320 A1 | * | 10/2020 | Fukuda | E02F 9/2292 |

FOREIGN PATENT DOCUMENTS

JP 2017-179923 A 10/2017

* cited by examiner

*Primary Examiner* — John Kwon
*Assistant Examiner* — Johnny H Hoang
(74) *Attorney, Agent, or Firm* — Greenblum & Bernstein, P.L.C.

(57) ABSTRACT

A working machine includes a controller configured or programmed to perform an automatic deceleration for automatically decelerating a left traveling motor and a right traveling motor rotated at a second speed by shifting from the second speed to the first speed, and to determine a deceleration threshold that is used for judging whether the automatic deceleration has to be performed or not.

19 Claims, 9 Drawing Sheets

WORKING MACHINE

FIELD OF THE INVENTION

The present invention relates to a working machine such as a skid steer loader, a compact track loader, or a backhoe.

DESCRIPTION OF THE RELATED ART

Japanese unexamined patent application publication No. 2017-179923 discloses a technique for decelerating and accelerating a working machine. The working machine described in Japanese unexamined patent application publication No. 2017-179923 has a prime mover including an engine, a hydraulic pump configured to be driven by power of the prime mover and to deliver an operation fluid, a traveling hydraulic device configured to switch a speed between a first speed and a second speed that is faster than the first speed according to a pressure of the operation fluid, an operation valve configured to change the pressure of the operation fluid applied to the traveling hydraulic device, and a measurement device configured to detect the pressure of the operation fluid. When a detected pressure, which is a pressure of the operation fluid detected by the measurement device, drops from a set pressure corresponding to the second speed to a predetermined pressure or lower, the operation valve reduces the pressure of the operation fluid applied to the traveling hydraulic device to decelerate the traveling hydraulic device by shifting to the first speed.

SUMMARY OF THE INVENTION

In one aspect of the present invention, a working machine includes a machine body, a prime mover provided on the machine body, a left traveling device provided on a left portion of the machine body, a right traveling device provided on a right portion of the machine body, a left traveling motor configured to output power to the left traveling device and to be rotated at a speed shiftable between a first speed and a second speed higher than the first speed, a right traveling motor configured to output power to the right traveling device and to be rotated at a speed shiftable between the first speed and the second speed higher than the first speed, and a controller configured or programmed to perform an automatic deceleration for automatically decelerating the left traveling motor and the right traveling motor rotated at the second speed by shifting from the second speed to the first speed, and to determine a deceleration threshold that is used for judging whether the automatic deceleration has to be performed or not.

The working machine includes a traveling operation member operable to change rotational directions of the left traveling motor and the right traveling motor. The controller is configured or programmed to change the deceleration threshold according to an operation of the traveling operation member.

The controller is configured or programmed to acquire either a turn correction coefficient or a straight-traveling correction coefficient, the turn correction coefficient being provided for determining a deceleration threshold when the operation of the traveling operation member corresponds to that for turning of the working machine, the straight-traveling correction coefficient being provided for determining another deceleration threshold when the operation of the traveling operation member corresponds to that for straight-traveling of the working machine. The controller is configured or programmed to switch the turn correction coefficient to the straight-traveling correction coefficient when the operation of the traveling operation member is changed to that for the straight-traveling.

The controller is configured or programmed to change the deceleration threshold according to a revolving speed of the prime mover.

The controller is configured or programmed to change the deceleration threshold according to a difference between a revolving speed of the prime mover and a predetermined revolving speed.

The working machine includes a first circulation fluid line connected to a first port and a second port of a left traveling pump and connected to the left traveling motor, a second circulation fluid line connected to a third port and a fourth port of a right traveling pump and connected to the right traveling motor, a first pressure detector provided on a portion of the first circulation fluid line connected to a first port of the left traveling motor and configured to detect a first traveling pressure that is a pressure of operation fluid applied to the first circulation fluid line during rotation of the left traveling motor, a second pressure detector provided on another portion of the first circulation fluid line connected to a second port of the left traveling motor and configured to detect a second traveling pressure that is a pressure of operation fluid applied to the first circulation fluid line during rotation of the left traveling motor, a third pressure detector provided on a portion of the second circulation fluid line connected to a third port of the right traveling motor and configured to detect a third traveling pressure that is a pressure of operation fluid applied to the second circulation fluid line during rotation of the right traveling motor, and a fourth pressure detector provided on another portion of the second circulation fluid line connected to a fourth port of the right traveling motor and configured to detect a fourth traveling pressure that is a pressure of operation fluid applied to the second circulation fluid line during rotation of the right traveling motor. The controller is configured or programmed to perform the automatic deceleration based on the determined deceleration threshold and any one of the first traveling pressure, the second traveling pressure, the third traveling pressure, and the fourth traveling pressure in a state where the left traveling motor and the right traveling motor are each rotated at the second speed.

The controller is configured or programmed to change the deceleration threshold when the operation of the traveling operation member corresponds to that for turning of the working machine.

DETAILED DESCRIPTION OF THE PREFERRED EMBODIMENTS

A preferred embodiment of a hydraulic system for a working machine and the working machine having the hydraulic system will be described below with reference to drawings.

Figure 9:
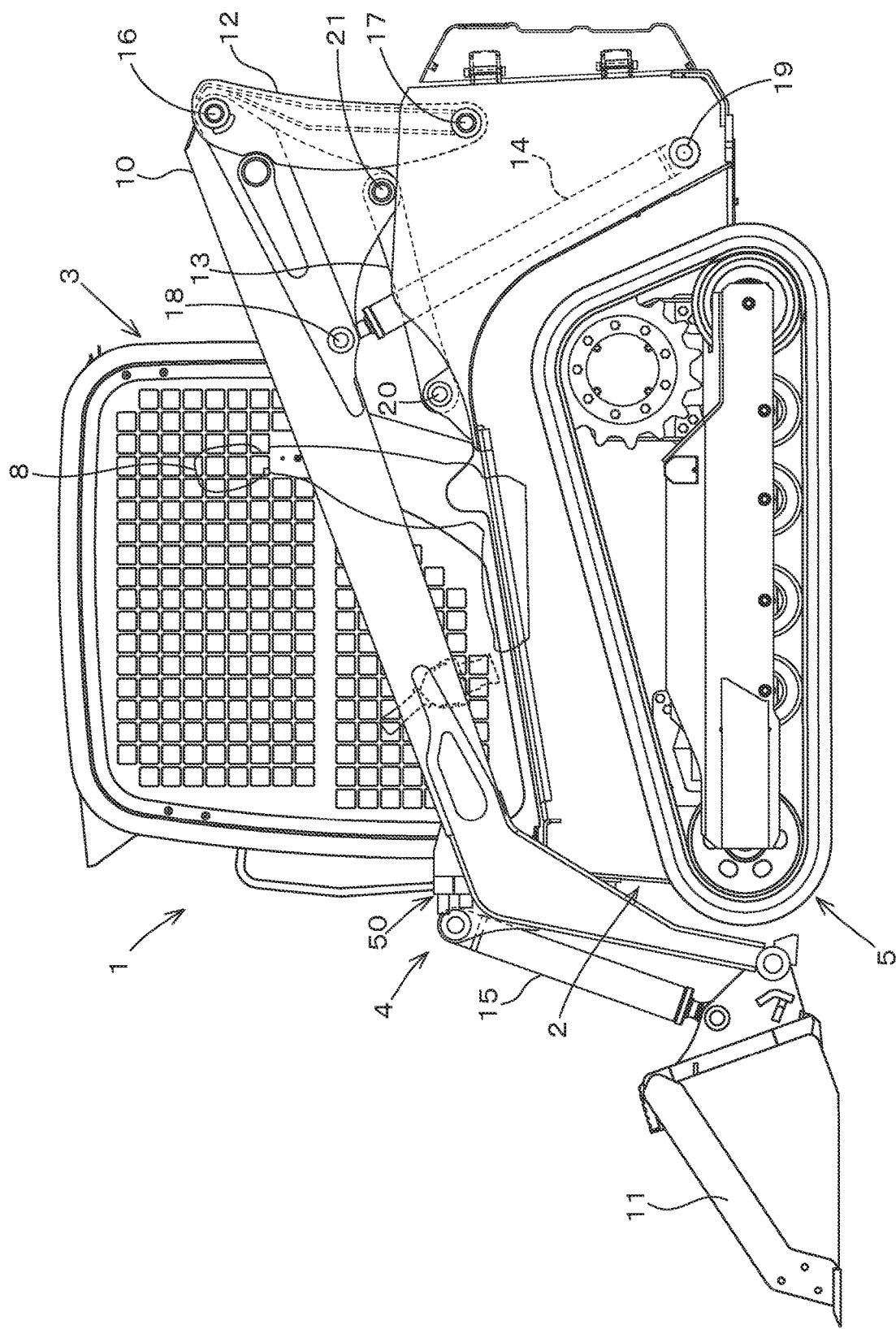
FIG. 9 is a side view of a track loader that is an example of the working machine.

FIG. 9, shows a side view of the working machine. In FIG. 9, a compact track loader is shown as an example of the working machine. However, the working machine is not limited to a compact track loader, but may be another typed loader, such as a skid steer loader, for example. In addition, the working machine may be other than any loader.

As shown in FIG. 9, the working machine 1 has a machine body 2, a cabin 3, a working device 4, and a pair of traveling devices 5L and 5R. In the embodiment of the present invention, a forward direction from a driver siting on a driver seat 8 of the working machine 1 (a left side in FIG. 9) is referred to as the front, a rearward direction from the driver (a right side in FIG. 9) is referred to as the rear, a leftward direction from the driver (a front surface side of FIG. 9) is referred to as the left, and a rightward direction from the driver (a back surface side of FIG. 9) is referred to as the right. A horizontal direction orthogonal to a fore-and-aft direction is referred to as a machine width direction. A direction from the center of the machine body 2 to the right or left is referred to as a machine outward direction. In other words, the machine outward direction is one machine width direction away from the machine body 2. A direction opposite to the machine outward direction is referred to as a machine inward direction. In other words, the machine inward direction is the other machine width direction approaching the machine body 2.

The cabin 3 is mounted on the machine body 2. The cabin 3 incorporates the driver seat 8. The working device 4 is attached to the machine body 2. A pair of traveling devices 5L and 5R are provided on outer sides of the machine body 2. A prime mover 32 is mounted on a rear inside portion of the machine body 2.

The working device 4 includes booms 10, a working tool 11, lift links 12, control links 13, boom cylinders 14, and bucket cylinders 15.

The booms 10 are arranged on right and left sides of the cabin 3 swingably up and down. The working tool 11 is a bucket, for example. The bucket 11 is arranged at tip portions (that is, front end portions) of the booms 10 movably up and down. The lift links 12 and the control links 13 support base portions (that is, rear portions) of the booms 10 so that the booms 10 can be swung up and down. The boom cylinders 14 are extended and contracted to lift and lower the booms 10. The bucket cylinders 15 are extended and contracted to swing the bucket 11 up and down.

Front portions of the right and left booms 10 are connected to each other by a deformed connecting pipe. Base portions (that is, rear portions) of the booms 10 are connected to each other by a circular connecting pipe.

The lift links 12, control links 13, and boom cylinders 14 are arranged on right and left sides of the machine body 2 to correspond to the right and left booms 10.

The lift links 12 are extended vertically from rear portions of the base portions of the booms 10. Upper portions (that is, one ends) of the lift links 12 are pivotally supported on the rear portion of the base portions of the booms 10 via respective pivot shafts 16 (referred to as first pivot shafts) rotatably around their lateral axes. Lower portions (that is, the other ends) of the lift links 12 are pivotally supported on a rearward portion of the machine body 2 via respective pivot shafts 17 (referred to as second pivot shafts) rotatably around their lateral axes. The second pivot shafts 17 are provided below the first pivot shafts 16.

Upper portions of the boom cylinders 14 are pivotally supported via respective pivot shafts 18 (referred to as third pivot shafts) rotatably around their lateral axes. The third pivot shafts 18 are provided at the base portions of the booms 10, especially, at front portions of the base portions. Lower portions of the boom cylinders 14 are pivotally supported respective pivot shafts 19 (referred to as fourth pivot shafts) rotatably around their lateral axes. The fourth pivot shafts 19 are provided near a lower portion of the rear portion of the machine body 2 and below the third pivot shafts 18.

The control links 13 are provided in front of the lift links 12. One ends of the control links 13 are pivotally supported via respective pivot shafts 20 (referred to as fifth pivot shafts) rotatably around their lateral axes. The fifth pivot shafts 20 are provided on the machine body 2 forward of the lift links 12. The other ends of the control links 13 are pivotally supported via respective pivot shafts 21 (referred to as sixth pivot shafts) rotatably around their lateral axes. The sixth pivot shafts 21 are provided on the booms 10 forwardly upward from the second pivot shafts 17.

By extending and contracting the boom cylinders 14, the booms 10 are swung up and down around the first pivot shafts 16 with the base portions of the booms 10 supported by the lift links 12 and the control links 13, thereby lifting and lowering the tip end portions of the booms 10. The control links 13 are swung up and down around the fifth pivot shafts 20 by the vertical swinging of the booms 10. The lift links 12 are swung back and forth around the second pivot shafts 17 by the vertical swinging of the control links 13.

An alternative working tool instead of the bucket 11 can be attached to the front portions of the booms 10. For example, the alternative working tool is an attachment (that is, an auxiliary attachment) such as a hydraulic crusher, a hydraulic breaker, an angle broom, an earth auger, a pallet fork, a sweeper, a mower, a snow blower, or the like.

A connector member 50 is provided at the front portion of the left boom 10. The connector member 50 is a device configured to connect a hydraulic equipment attached to the auxiliary attachment to a first piping member such as a pipe provided on the left boom 10. Specifically, the first piping member can be connected to one end of the connector member 50, and a second piping member connected to the hydraulic equipment of the auxiliary attachment can be connected to the other end. In this manner, an operation fluid flowing in the first piping member passes through the second piping member and is supplied to the hydraulic equipment.

The bucket cylinders 15 are arranged respectively near the front portions of the booms 10. The bucket cylinders 15 are extended and contracted to swing the bucket 11.

Of the pair of traveling devices 5L and 5R, the traveling device 5L is provided on a left side of the machine body 2, and the traveling device 5R is provided on a right side of the machine body 2. In the embodiment, crawler typed (including semi-crawler typed) traveling devices are adopted as the pair of traveling devices 5L and 5R. Wheel-type traveling device having front wheels and rear wheels may also be adopted. For convenience of explanation, the traveling device 5L may be referred to as the left traveling device 5L, and the traveling device 5R may be referred to as the right traveling device 5R.

The prime mover 32 is an internal combustion engine such as a diesel engine, a gasoline engine, an electric motor, or the like. In the embodiment, the prime mover 32 is the diesel engine, but is not limited thereto.

Next, the hydraulic system for the working machine will be described.

Figure 1:
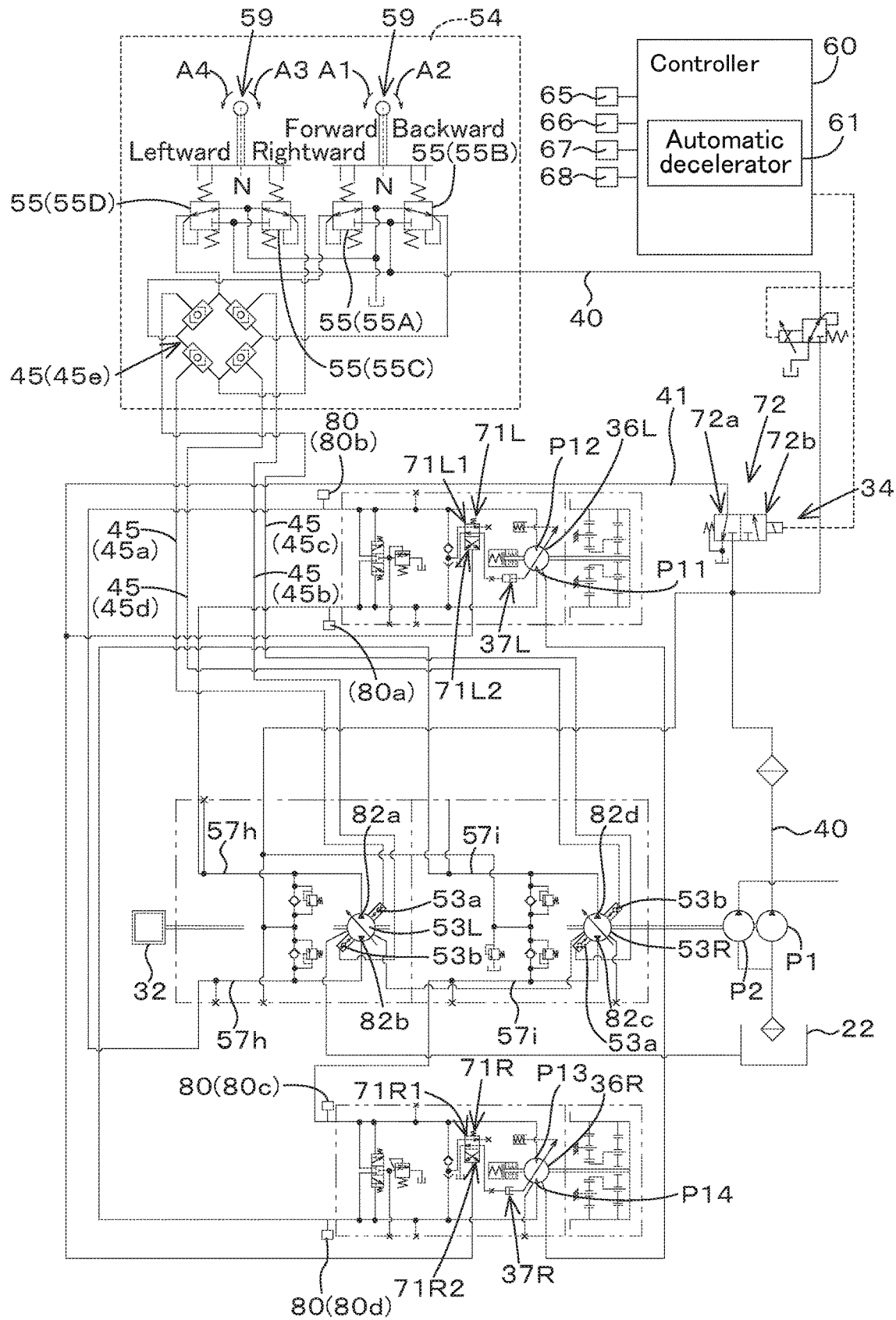
FIG. 1 is a diagram of a hydraulic system (a hydraulic circuit) for a working machine.

As shown in FIG. 1, the hydraulic system for the working machine has a first hydraulic pump P1 and a second hydraulic pump P2. The first hydraulic pump P1 is a pump configured to be driven by power of the prime mover 32 and includes a constant displacement gear pump. The first hydraulic pump P1 is capable of delivering operation fluid stored in a tank 22. Specifically, the first hydraulic pump P1 delivers operation fluid that is mainly used for control. For convenience of explanation, the tank 22 that stores operation fluid may be referred to as an operation fluid tank. Of the operation fluid delivered from the first hydraulic pump P1, the operation fluid used for control is referred to as pilot fluid, and a pressure of the pilot fluid is referred to as a pilot pressure.

The second hydraulic pump P2 is a pump to be driven by power of the prime mover 32, and includes a constant displacement gear pump. The second hydraulic pump P2 is capable of delivering operation fluid stored in the tank 22 and, for example, supplies the operation fluid to fluid lines of a working system. For example, the second hydraulic pump P2 supplies operation fluid to control valves (that is, flow-rate control valves) that control the boom cylinders 14 for operating the booms 10, the bucket cylinders 15 for operating the bucket, and an auxiliary hydraulic actuator for operating the auxiliary hydraulic actuator.

The hydraulic system for the working machine has a pair of traveling motors 36L and 36R and a pair of traveling pumps 53L and 53R. The pair of traveling motors 36L and 36R output power transmitted to the pair of traveling devices 5L and 5R. Of the pair of traveling motors 36L and 36R, the traveling motor 36L transmits rotational power to the traveling device (referred to as a left traveling device) 5L, and the traveling motor 36R transmits rotational power to the traveling device (referred to as a right traveling device) 5R.

The pair of traveling pumps 53L and 53R are pumps to be driven by power of the prime mover 32 and are variable displacement axial pumps with respective swash plates, for example. The pair of traveling pumps 53L and 53R are driven to supply operation fluid respectively to the pair of traveling motors 36L and 36R. Of the pair of traveling pumps 53L and 53R, the traveling pump 53L supplies the operation fluid to the traveling motor 36L, and the traveling pump 53R supplies the operation fluid to the motor 36R.

For convenience of explanation, the traveling pump 53L may be referred to as a left traveling pump 53L, the traveling pump 53R may be referred to as a right traveling pump 53R, the traveling motor 36L may be referred to as a left traveling motor 36L, and the traveling motor 36R may be referred to as a right traveling motor 36R.

Each of the left traveling pump 53L and the right traveling pump 53R has a pressure-receiving portion 53a and a pressure-receiving portion 53b to which a pressure (that is, a pilot pressure) of the operation fluid (that is, pilot fluid) from the first hydraulic pump P1 is applied, and angles of the swash plates are changed by the pilot pressures applied to the pressure-receiving portions 53a and 53b. By changing an angle of each of the swash plates, an output (that is, a delivery amount of operation fluid) and an operation fluid delivery direction of each of the left and right traveling pumps 53L and 53R can be changed. The left traveling pump 53L has a first port 82a to deliver operation fluid therefrom during normal rotation of the left traveling motor 53L 36L, and a second port 82b to deliver operation fluid therefrom during reverse rotation of the left traveling motor 36L. The right traveling pump 53R has a third port 82c to deliver operation fluid therefrom during normal rotation of the right traveling motor 36R, and a fourth port 82d to deliver operation fluid therefrom during reverse rotation of the right traveling motor 36R.

The first port 82a and the second port 82b of the left traveling pump 53L are connected to the left traveling motor 36L by a connecting fluid line (referred to as a first circulation fluid line) 57h, and the operation fluid delivered from the left traveling pump 53L is supplied to the left traveling motor 36L. The third port 82c and the fourth port 82d of the right traveling pump 53R are connected to the right traveling motor 36R by a connecting fluid line (referred to as a second circulation fluid line) 57i, and the operation fluid delivered from the right traveling pump 53R is supplied to the right traveling motor 36R.

A first relief valve 81a is connected to a portion of the connecting fluid line 57h connected to the first port 82a of the left traveling pump 53L, and a second relief valve 81b is connected to another portion of the connecting fluid line 57h connected to the second port 82b of the left traveling pump 53L. For example, the first relief valve 81a is likely to function when a pressure applied to the connecting fluid line 57h is increased by the forward rotation of the left traveling motor 36L, and the second relief valve 81b is likely to function when a pressure applied to the connecting fluid line 57h is increased by the reverse rotation of the left traveling motor 36L.

A third relief valve 81c is connected to a portion of the fluid line 57i connected to the third port 82c of the right traveling pump 53R, and a fourth relief valve 81d is connected to another portion of the fluid line 57i connected to the fourth port 82d of the right traveling pump 53R. For example, the third relief valve 81c is likely to function when a pressure applied to the connecting fluid line 57i is increased by the forward rotation of the right traveling motor 36R, and the fourth relief valve 81d is likely to function when a pressure applied to the connecting fluid line 57i is increased by the reverse rotation of the right traveling motor 36R.

The left traveling motor 36L can be rotated by operation fluid delivered from the left traveling pump 53L, and at a rotation speed (that is, number of rotations) variable according to a flow rate of the operation fluid. A swash plate switching cylinder 37L is connected to the left traveling motor 36L, so that a rotation speed (that is, number of rotations) of the left traveling motor 36L can also be changed by extending or contracting the swash plate switching cylinder 37L in either one of opposite directions. When the swash plate switching cylinder 37L is contracted, a rotation speed of the left traveling motor 36L is set to a low speed (referred to as a first speed), and when the swash plate switching cylinder 37L is extended, a rotation speed of the left traveling motor 36L is set to a high speed (referred to as a second speed). In other words, the rotation speed of the left traveling motor 36L is shiftable between the first speed that is the low speed stage and the second speed that is the high speed stage.

The right traveling motor 36R can be rotated by operation fluid delivered from the right traveling pump 53R, and at a rotation speed (that is, number of rotations) variable according to a flow rate of the operation fluid. A swash plate switching cylinder 37R is connected to the right traveling motor 36R, so that a rotation speed (that is, number of rotations) of the right traveling motor 36R can also be changed by extending or contracting the swash plate switching cylinder 37R in either one of opposite directions. When the swash plate switching cylinder 37R is contracted, a rotation speed of the right traveling motor 36R is set to a low speed (referred to as a first speed), and when the swash plate switching cylinder 37R is extended, a rotation speed of the right traveling motor 36R is set to a high speed (referred to as a second speed). In other words, the rotation speed of the right traveling motor 36L is shiftable between the first speed that is the low speed stage and the second speed that is the high speed stage.

As shown in FIG. 1, the hydraulic system for the working machine has a traveling switching valve 34. The traveling switching valve 34 is shiftable between a first state where rotation speeds (that is, numbers of rotations) of the traveling motors (that is, the lefts traveling motor 36L and the right traveling motor 36R) are each set at the first speed and a second state where rotation speeds of the traveling motors are each set at the second speed. The travel switching valve 34 includes first switching valves 71L and 71R and a second switching valve 72.

The first switching valve 71L is connected via a fluid line to the swash plate switching cylinder 37L of the left traveling motor 36L, and is configured as a two-position switching valve shiftable between a first position 71L1 and a second position 71L2. The first switching valve 71L, when set at the first position 71L1, contracts the swash plate switching cylinder 37L, and when set at the second position 71L2, extends the swash plate switching cylinder 37L.

The first switching valve 71R is connected via a fluid line to the swash plate switching cylinder 37R of the right traveling motor 36R, and is configured as a two-position switching valve shiftable between a first position 71R1 and a second position 71R2. The first switching valve 71R, when set at the first position 71L1, contracts the swash plate switching cylinder 37R, and when set at the second position 71R2, extends the swash plate switching cylinder 37R.

The second switching valve 72 is a solenoid valve that switches the first switching valve 71L and the first switching valve 71R, and is configured as a two-position switching valve shiftable based on magnetization between a first position 72a and a second position 72b. The second switching valve 72, the first switching valve 71L and the first switching valve 71R are connected by a fluid line 41. The second switching valve 72, when set at the first position 72a, switches the first switching valve 71L and the first switching valve 71R to the first positions 71L1 and 71R1, and when set at the second position 72b, switches the first switching valve 71L and the first switching valve 71R to the second positions 71L2 and 71R2.

The traveling switching valve 34 is set in the first state to shift each of rotation speeds of the traveling motors (that is, the traveling motor 36L and the traveling motor 36R) to the first speed when the second switching valve 72 is set at the first position 72a, the first switching valve 71L is set at the first position 71L1, and the first switching valve 71R is set at the first position 71R1. The traveling switching valve 34 is set in the second state to shift each of rotation speeds of the traveling motors (that is, the traveling motor 36L and the traveling motor 36R) to the second speed when the second switching valve 72 is set at the second position 72b, the first switching valve 71L is set at the second position 71L2, and the first switching valve 71R is set at the second position 71R2.

Accordingly, due to the traveling switching valve 34, the traveling motors (that is, the traveling motor 36L and the traveling motor 36R) are set at a speed stage shiftable between the first speed that is the low speed stage and the second speed that is the high speed stage.

An operation device (that is, a traveling operating device) 54 is configured to apply operation fluid to the pressure-receiving portions 53a and 53b of the traveling pumps (that is, the left traveling pump 53L and the right traveling pump 53R) when a traveling operation member 59 is operated, and is capable of changing the angles of swash plates (referred to as swash plate angles) of the traveling pumps 53L and 53R. The operation device 54 includes the traveling operation member 59 and a plurality of operation valves 55.

The traveling operation member 59 is an operation lever that is supported on the operation valves 55 and swings in a lateral direction (that is, the machine width direction) or the fore-and-aft direction. The traveling operation member 59 is operable to the right and to the left from a neutral position N, and to the front and to the rear from the neutral position N. In other words, the traveling operation member 59 is swingable in at least four directions from the neutral position N. For convenience of explanation, the forward and backward directions, that is, opposite fore-and-aft directions, may be referred to as first directions. The rightward and leftward directions, that is, opposite lateral directions (that is, opposite machine width directions), are may be referred to as second directions.

The plurality of operation valves 55 are operated by the common, i.e., single, traveling operation member 59. The plurality of operation valves 55 are actuated according to swinging of the traveling operation member 59. A delivery fluid line 40 is connected to the plurality of operation valves 55, so that operation fluid (that is, pilot fluid) from the first hydraulic pump P1 can be supplied to the operation valves 55 through the output fluid line 40. The plurality of operation valves 55 include an operation valve 55A, operation valve 55B, operation valve 55C, and operation valve 55D.

When the traveling operation member 59 is swung forward (that is, in one of the opposite fore-and-aft directions (or in one of the opposite first directions)), i.e., when a forward operation is performed, the operation valve 55A outputs operation fluid having a pressure variable according to an operation amount (operation) of the forward operation. When the traveling operation member 59 is swung backward (that is, in the other of the opposite fore-and-aft directions (or in the other of the opposite first directions)), i.e., when a backward operation is performed, the operation valve 55B outputs operation fluid having a pressure variable according to an operation amount (operation) of the backward operation. When the traveling operation member 59 is swung rightward (that is, in one of the opposite lateral directions (or in one of the opposite second directions)), i.e., when a rightward operation is performed, the operation valve 55C outputs operation fluid having a pressure variable according to an operation amount (operation) of the rightward operation. When the traveling operation member 59 is swung leftward (that is, in the other of the opposite lateral directions (or in the other of the opposite second directions)), i.e., when a leftward operation is performed, the operation valve 55D outputs operation fluid having a pressure variable according to an operation amount (operation) of the leftward operation.

The plurality of operation valves 55 are connected to the traveling pumps (the traveling pump 53L and the traveling pump 53R) by the traveling fluid line 45. In other words, the traveling pumps (the traveling pump 53L and the traveling pump 53R) are hydraulic equipment that are configured to be operated by operation fluid output from the operation valves 55 (that is, the operation valve 55A, operation valve 55B, operation valve 55C, and operation valve 55D).

The traveling fluid line 45 includes a first traveling fluid line 45a, a second traveling fluid line 45b, a third traveling fluid line 45c, a fourth traveling fluid line 45d, and a fifth traveling fluid line 45e. The first traveling fluid line 45a is a fluid line connected to the pressure-receiving portion (referred to as a first pressure-receiving portion) 53a of the left traveling pump 53L, and is a fluid line through which operation fluid to be applied to the pressure-receiving portion (the first pressure-receiving portion) 53a flows when the traveling operation member 59 is operated. The second traveling fluid line 45b is a fluid line connected to the pressure-receiving portion (referred to as a second pressure-receiving portion) 53b of the left traveling pump 53L, and is a fluid line through which operation fluid to be applied to the pressure-receiving portion (the second pressure-receiving portion) 53b flows when the traveling operation member 59 is operated. The third traveling fluid line 45c is a fluid line connected to the pressure-receiving portion (referred to as a third pressure-receiving portion) 53a of the right traveling pump 53R, and is a fluid line through which operation fluid to be applied to the pressure-receiving portion (the third pressure-receiving portion) 53a flows when the traveling operation member 59 is operated. The fourth traveling fluid line 45d is a fluid line connected to the pressure-receiving portion (referred to as a fourth pressure-receiving portion) 53b of the right traveling pump 53R, and is a fluid line through which operation fluid to be applied to the pressure-receiving portion (the fourth pressure-receiving portion) 53b flows when the traveling operation member 59 is operated. The fifth traveling fluid line 45e is a fluid line that connects the operation valves 55 to the first traveling fluid line 45a, the second traveling fluid line 45b, the third traveling fluid line 45c, and the fourth traveling fluid line 45d.

Figure 2:
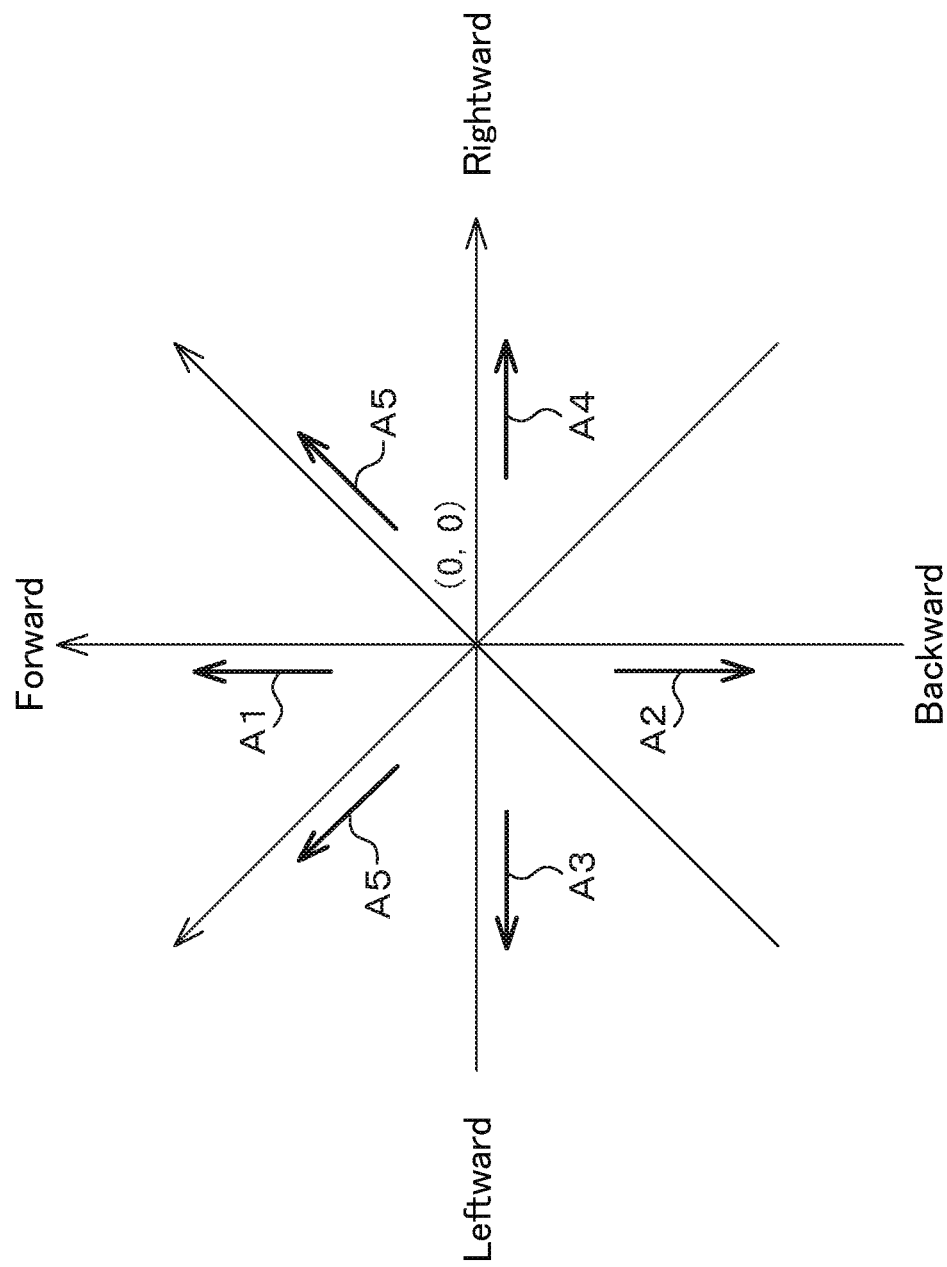
FIG. 2 is a diagram of operational directions and the like of a traveling operation member.

When the traveling operation member 59 is swung forward (in a direction indicated by an arrowed line A1 in FIGS. 1 and 2), the operation valve 55A is operated to output a pilot pressure therefrom. This pilot pressure is applied to the pressure-receiving portion 53a of the left traveling pump 53L via the first traveling fluid line 45a and to the pressure-receiving portion 53a of the right traveling pump 53R via the third traveling fluid line 45c. In this manner, the swash plate angles of the left traveling pump 53L and the right traveling pump 53R are changed to rotate the left traveling motor 36L and the right traveling motor 36R forwardly (referred to as forward rotation), whereby the working machine 1 travels straight forward.

When the traveling operation member 59 is swung backward (in a direction indicated by an arrowed line A2 in FIGS. 1 and 2), the operation valve 55B is operated to output a pilot pressure therefrom. This pilot pressure is applied to the pressure-receiving portion 53b of the left traveling pump 53L via the second traveling fluid line 45b and to the pressure-receiving portion 53b of the right traveling pump 53R via the fourth traveling fluid line 45d. In this manner, the swash plate angles of the left traveling pump 53L and the right traveling pump 53R are changed to rotate the left traveling motor 36L and the right traveling motor 36R reversely (referred to as backward rotation), whereby the working machine 1 travels straight backward.

When the traveling control member 59 is swung to the right (in a direction indicated by an arrowed line A3 in FIGS. 1 and 2), the control valve 55C is operated to output a pilot pressure therefrom. This pilot pressure is applied to the pressure-receiving portion 53a of the left traveling pump 53L via the first traveling fluid line 45a, and to the pressure-receiving portion 53b of the right traveling pump 53R via the fourth traveling fluid line 45d. In this manner, the swash plate angles of the left traveling pump 53L and the right traveling pump 53R are changed to rotate the left traveling motor 36L forwardly, and to rotate the right traveling motor 36R reversely, whereby the working machine 1 spins to turn (spin-turns) rightward.

When the traveling control member 59 is swung to the left (in a direction indicated by an arrowed line A4 in FIGS. 1 and 2), the control valve 55D is operated to output a pilot pressure therefrom. This pilot pressure is applied to the pressure-receiving portion 53a of the right traveling pump 53R via the third traveling fluid line 45c, and to the pressure-receiving portion 53b of the left traveling pump 53L via the second traveling fluid line 45b. In this manner, the swash plate angles of the left traveling pump 53L and the right traveling pump 53R are changed to rotate the left traveling motor 36L reversely, and to rotate the right traveling motor 36R forwardly, whereby the working machine 1 spins to turn (spin-turns) leftward.

When the traveling operation member 59 is swung in an oblique direction (in a direction indicated by an arrowed line A5 in FIG. 2), rotation directions and rotation speeds of the left traveling motor 36L and the right traveling motor 36R are determined by a differential pressure between the pilot pressures applied to the pressure receiving portion 53a and the pressure receiving portion 53b, so that the working machine 1 pivots to turn rightward or leftward while traveling forward or backward.

That is, when the traveling operation member 59 is swung in a forwardly leftward oblique direction, the working machine 1 turns to the left while traveling forward at a speed corresponding to the swing angle of the traveling operation member 59. When the traveling operation member 59 is swung in a forwardly rightward oblique direction, the working machine 1 turns to the right while traveling forward at a speed corresponding to the swing angle of the traveling operation member 59. When the traveling operation member 59 is swung in a backwardly leftward oblique direction, the working machine 1 turns to the left while traveling backward at a speed corresponding to the swing angle of the traveling operation member 59. When the traveling operation member 59 is swung in a backwardly rightward oblique direction, the working machine 1 turns to the right while traveling backward at a speed corresponding to the swing angle of the traveling operation member 59.

As shown in FIG. 1, the working machine 1 has a controller 60. The controller 60 performs various controls of the working machine 1 and includes a semiconductor such as a CPU or an MPU, an electrical and electronic circuit, or/and the like. An accelerator 65, a mode switch 66, a speed changer switch 67, and a plurality of rotation detectors 68 are connected to the controller 60.

The mode switch 66 is a switch configured to enable or disable automatic deceleration. For example, the mode switch 66 is a switch capable of being switched ON and OFF, so that the mode switch 66, when switched ON, enables the automatic deceleration operation, and when switched OFF, the mode switch 66 disables the automatic deceleration operation.

The speed changer switch 67 is provided in the vicinity of the driver seat 8 and can be operated by a driver (an operator). The speed changer switch 67 is manually operable to selectively set the rotation speed stage of the traveling motors 36L and 36R (that is, the left traveling motor 36L and right traveling motor 36R) to either the first speed or the second speed. For example, the speed changer switch 67 is a seesaw switch shiftable between a first speed position and a second speed position, thereby selectively instructing either an accelerating operation to increase rotation speeds of the traveling motors 36L and 36R by shifting their speed stage from the first speed to the second speed or a decelerating operation to reduce rotation speeds of the traveling motors 36L and 36R by shifting their speed stage from the second speed to the first speed.

The rotation detector 68 includes a sensor or the like to detect a prime mover revolving speed that is the revolving speed of the prime mover 32.

The controller 60 includes an automatic decelerator 61. The automatic decelerator 61 includes an electrical and electronic circuit or the like installed in the controller 60, a computer program stored in the controller 60, and/or the like.

The automatic decelerator 61 executes an automatic deceleration control when a traveling mode is executed and the automatic deceleration is enabled, and does not execute the automatic deceleration control when the traveling mode is executed and the automatic deceleration is disabled. In addition, the automatic decelerator 61 does not perform the automatic deceleration control even in an acquisition mode.

In the automatic deceleration control, in a state where the traveling motors (that is, the traveling motor 36L and the traveling motor 36R) are rotated at the second speed, the rotation speeds of the traveling motors (that is, the traveling motor 36L and the traveling motor 36R) are automatically reduced by shifting the speed stage from the second speed to the first speed when a predetermined condition (referred to as an automatic deceleration condition) is satisfied. In the automatic deceleration control, when the automatic deceleration condition is satisfied at least in a state where the traveling motors (that is, the left traveling motor 36L and the right traveling motor 36R) are rotated at the second speed, the controller 60 demagnetizes a solenoid of the second switching valve 72 to switch the second switching valve 72 from the second position 72b to the first position 72a so as to shift the speed stage from the second speed to the first speed, thereby reducing the rotation speeds of the traveling motor (that is, the left traveling motor 36L and the right traveling motor 36R). That is, in the automatic deceleration control, the controller 60 decelerates both the left traveling motor 36L and the right traveling motor 36R by shifting from the second speed to the first speed when the automatic deceleration is performed.

When a return condition is satisfied after the automatic deceleration is performed, the automatic decelerator 61 magnetizes a solenoid of the second switching valve 72 to switch the second switching valve 72 from the first position 72a to the second position 72b so as to shift the speed stage from the first speed to the second speed, thereby accelerating the traveling motors (that is, the left traveling motor 36L and the right traveling motor 36R), that is, restoring the preceding speed stage of the traveling motors. That is, the controller 60 accelerates both the left traveling motor 36L and the right traveling motor 36R by shifting the speed stage from the first speed to the second speed when returning from the first speed to the second speed.

When the automatic deceleration is disabled, the controller 60 performs a manual switching control to switch the speed stage of the traveling motors (that is, the left traveling motor 36L and the right traveling motor 36R) to either the first speed or the second speed according to an operation of the speed changer switch 67. In the manual switching control, when the speed changer switch 67 is switched to the first speed position, the solenoid of the second switching valve 72 is demagnetized to set the speed stage of the traveling motors (that is, the left traveling motor 36L and the right traveling motor 36R) to the first speed. In the manual switching control, when the speed changer switch 67 is switched to the second speed position, the speed stage of the traveling motors (that is, the left traveling motor 36L and the right traveling motor 36R) is set to the second speed by demagnetizing the solenoid of the second switching valve 72.

The controller 60 performs the automatic deceleration based on pressures in the circulation fluid lines 57h and 57i. A plurality of pressure detectors 80 are connected to the circulation fluid lines 57h and 57i. The plurality of pressure detection devices 80 include a first pressure detector 80a, a second pressure detector 80b, a third pressure detector 80c, and a fourth pressure detector 80d. The first pressure detector 80a is provided on a portion of the circulation fluid line 57h connected to the first port P11 of the left traveling motor 36L, and detects a first traveling pressure LF(t) that is a pressure in the portion connected to the first port P11. The second pressure detector 80b is provided on another portion of the circulation fluid line 57h connected to the second port P12 of the left traveling motor 36L, and detects a second traveling pressure LB(t) that is a pressure in the portion connected to the second port P12. The third pressure detector 80c is provided on a portion of the circulation fluid line 57i connected to the third port P13 of the right traveling motor 36R, and detects a third traveling pressure RF(t) that is a pressure in the portion connected to the third port P13. The fourth pressure detector 80d is provided on another portion of the circulation fluid line 57i connected to the fourth port P14 of the right traveling motor 36R, and detects a fourth traveling pressure RB(t) that is a pressure in the portion connected to the fourth port P14.

The controller 60 (that is, the automatic decelerator 61) performs the automatic deceleration based on the first traveling pressure LF (t, rpm) detected by the first pressure detector 80a, the second traveling pressure LB (t, rpm) detected by the second pressure detector 80b, the third traveling pressure RF (t, rpm) detected by the third pressure detector 80c, and the fourth traveling pressure RB (t, rpm) detected by the fourth pressure detector 80d.

The sign "(t, rpm)" indicated in the first traveling pressure LF (t, rpm), the second traveling pressure LB (t, rpm), the third traveling pressure RF (t, rpm), and the fourth traveling pressure RB (t, rpm) is a notation indicating that the values are related to an actual revolving speed (rpm) of the prime mover at a certain time (t). Accordingly, each of the first traveling pressure LF (t, rpm) to the fourth traveling pressure RB (t, rpm) is a traveling pressure acquired at an actual revolving speed (rpm) of the prime mover at a time (t).

Specifically, as shown in Equation (1), the automatic decelerator 61 performs the automatic deceleration when any one of the first traveling pressure LF (t, rpm), the second traveling pressure LB (t, rpm), the third traveling pressure RF (t, rpm), and the fourth traveling pressure RB (t, rpm) becomes equal to or more than a deceleration threshold ST (rpm) that is a pressure value determined according to a revolving speed of the prime mover.

In Equation (1), a traveling pressure difference LF–LB (t, rpm), which is a difference between the first traveling pressure LF (t, rpm) and the second traveling pressure LB (t, rpm), may be used instead of the first traveling pressure LF (t, rpm), a traveling pressure difference LB–LF (t, rpm), which is a difference between the second traveling pressure LB (t, rpm) and the first traveling pressure LF (t, rpm), may be used instead of the second traveling pressure LB (t, rpm), a traveling pressure difference RF–RB (t, rpm), which is a difference between the third traveling pressure RF (t, rpm) and the fourth traveling pressure RB (t, rpm), may be used instead of the third traveling pressure RF (t, rpm), and a traveling pressure difference RB–RB (t, rpm), which is a difference between the fourth traveling pressure RB (t, rpm) and the third traveling pressure RF (t, rpm), may be used instead of the fourth traveling pressure RB (t, rpm).

(Equation 1)

$$\begin{pmatrix} LF(t, rpm) \\ LB(t, rpm) \\ RF(t, rpm) \\ RB(t, rpm) \end{pmatrix} \geq ST(rpm) \quad (1)$$

In a case where the working machine 1 is traveling, the controller 60 (the automatic decelerator 61) sets the deceleration threshold ST (rpm) to a value corresponding to a state of the working machine 1. That is, the controller 60 (the automatic decelerator 61) determines the deceleration threshold ST (rpm) with a correction coefficient η variable according to the state of the working machine 1, as shown in Equation (2). Pressure values A1 (rpm), A2 (rpm), A3 (rpm), and A4 (rpm) in Equation (2) are values determined to correspond to a certain revolving speed (rpm) of the prime mover. For example, they are pressures generated when the four relief valves provided on the circulation fluid lines start to function, or pressures generated when the pressures in the circulation fluid lines are stabilized after the relief valves function. The pressure value A1 (rpm), pressure value A2 (rpm), pressure value A3 (rpm), and pressure value A4 (rpm) are just examples and are not limited thereto.

(Equation 2)

$$ST(rpm) = \begin{pmatrix} A1(rpm) \\ A2(rpm) \\ A3(rpm) \\ A4(rpm) \end{pmatrix} \times \eta \quad (2)$$

Figure 3:
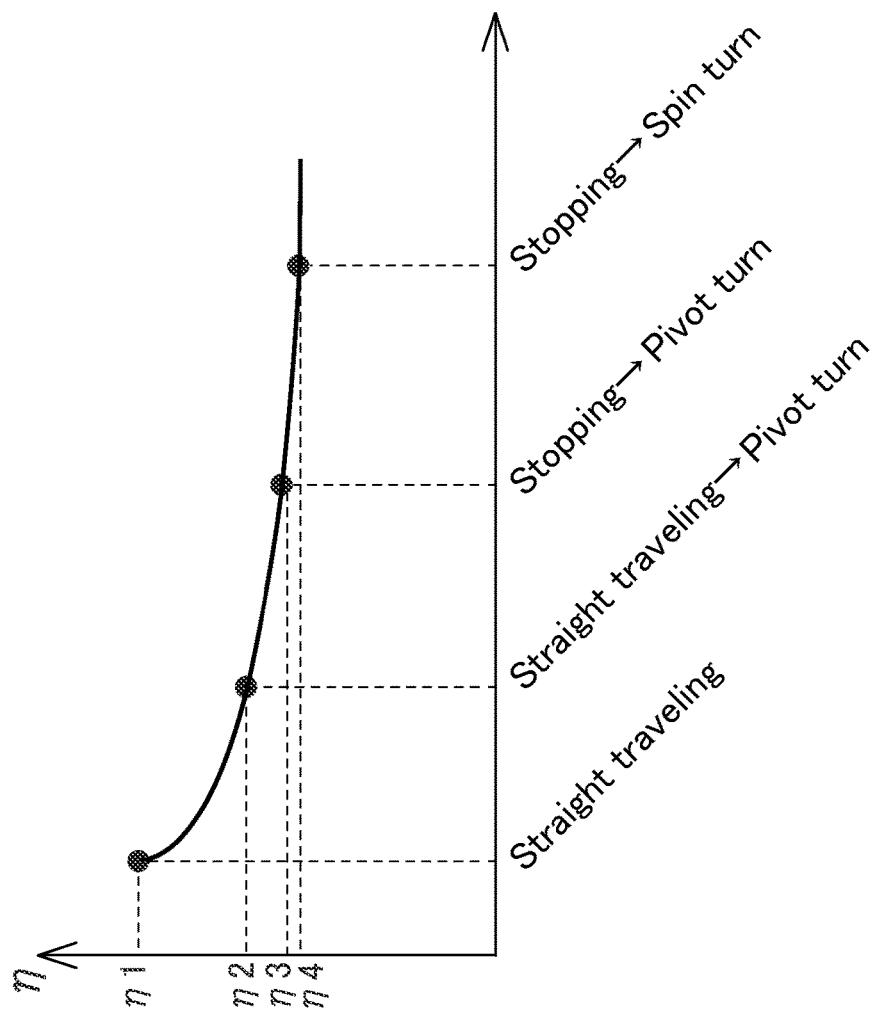
FIG. 3 is a graph showing an example of a relationship between a traveling state of the working machine and a correction coefficient η.

The controller 60 (the automatic decelerator 61) determines the deceleration threshold ST (rpm) according to an operation of the traveling operation member 59. FIG. 3 shows a correction curve representing a relationship between a state of traveling of the working machine 1 and the correction coefficient η.

As shown in FIG. 3, when the traveling operation member 59 is operated in the forward direction or the like to make the working machine 1 travel straight (forward), the automatic decelerator 61 sets the correction coefficient η to a correction coefficient η1. When the traveling operation member 59 operated in the forward direction is further operated in a right or left oblique direction to shift the working machine 1 into a pivot-turn state from the straight traveling state, the automatic decelerator 61 sets the correction coefficient η to a correction coefficient η2 that is lower than the correction coefficient η1. When the traveling operation member 59 is operated in the right or left oblique direction from the neutral position N to shift the working machine 1 into the pivot-turn state from a stopping state, the automatic decelerator 61 sets the correction coefficient η to a correction coefficient η3 that is lower than the correction coefficient η2. When the traveling operation member 59 is operated in the right or left direction from the neutral position N to shift the working machine 1 into a spin-turn state from the stopping state, the automatic decelerator 61 sets the correction coefficient η to a correction coefficient η4 that is lower than the correction coefficient η3.

That is, as shown in FIG. 3, the automatic decelerator 61 continuously changes the correction coefficient η (rpm) as the operation is shifted among "straight traveling", "pivot-turn from straight traveling", "pivot-turn from stopping", and "spin-turn from stopping", for example. As shown in FIG. 3, the correction curve representing the relationship between each of the operation patterns of the traveling operation member 59 (that is, straight traveling, stopping, pivot-turn, spin-turn) and the correction coefficient η is stored in a memory 63, and the controller 60 can rear the correction coefficient η from the memory 63 according to operation of the traveling operation member 69. It may be judged whether the working machine 1 is in any state of the straight traveling, the pivot-turn, the stopping, and the spin turn or not, based on an operational direction of the traveling operation member 59 detected by a sensor or the like or based on the first traveling pressure LF (t, rpm), the second traveling pressure LB (t, rpm), the third traveling pressure RF (t, rpm), or the fourth traveling pressure RB (t, rpm), and the way of judgment is not limited thereto.

As described above, the controller 60 (the automatic decelerator 61) can change the deceleration threshold ST (rpm) according to operation of the traveling operation member 59, that is, a state of operation of the traveling operation member 59.

The controller 60 (the automatic decelerator 61) may previously set the correction coefficient for turning (referred to as a turn correction coefficient) η corresponding to the turning (including the spin-turn and the pivot-turn) to a fixed value (or a default value), and may switch the turn correction coefficient to the correction coefficient for straight traveling (referred to as a straight-traveling correction coefficient) η corresponding to the straight traveling only when the operation of the traveling operation member 59 corresponds to that for the straight traveling, thereby changing the deceleration threshold ST (rpm).

Focusing on the turning (including the spin-turn and the pivot-turn) and the straight traveling, the controller 60 (the automatic decelerator 61) determines the deceleration threshold ST (rpm) for straight traveling of the machine body 2 to be higher than the deceleration threshold ST (rpm) for turning of the machine body 2 while a revolving speed of the prime mover 32 is kept constant. That is, when the revolving speed of the prime mover 32 is kept as being a predetermined revolving speed, the straight-traveling correction coefficient η is set to be greater than the turn correction coefficient η, so that it becomes harder to perform the automatic deceleration during the straight traveling than during the turning. In other words, while a revolving speed of the prime mover 32 is kept as being a predetermined speed, the controller 60 (the automatic decelerator 61) sets the turn correction coefficient η to be less than the straight-traveling correction coefficient η and sets the deceleration threshold ST (rpm) for turning to be lower than the deceleration threshold ST (rpm) for straight traveling, thereby easily performing the automatic deceleration during the turning.

When the first traveling pressure LF (t, rpm), the second traveling pressure LB (t, rpm), the third traveling pressure RF (t, rpm), and the fourth traveling pressure RB (t, rpm) become equal to or less than the return threshold SE (rpm) determined to correspond to a revolving speed of the prime mover in the state where the automatic deceleration is being performed, the controller 60 switches the speed stage of the traveling motors from the first speed to the second speed to cancel (return from) the automatic deceleration. While a revolving speed of the prime mover 32 is kept constant, the controller 60 (the automatic decelerator 61) sets the return threshold SE (rpm) for straight traveling of the machine body 2 to be higher than the return threshold SE (rpm) for turning of the machine body 2, so that the return from automatic deceleration is further easily performed during the straight traveling than during the turning. In other words, while a revolving speed of the prime mover 32 is kept constant, it is hard for the controller 60 (the automatic decelerator 61) to perform the return from the automatic deceleration during the turning because the return threshold SE (rpm) for turning is lower than the return threshold SE (rpm) for straight traveling. The straight traveling correction coefficient η may be changed according to a degree of the straight traveling. The degree of straight traveling may be calculated based on the pilot pressures or based on operational information acquired from the electrically acting traveling operation device 54, and may increase the correction coefficient η based on the calculation results. For example, it is assumed that an angle formed by the traveling operation member 59 when fully tilted forward is ninety degrees (deg), the angle being defined as that with respect to the center (that is, the neutral position N) serving as an initial position of the traveling operation member 59, the correction coefficient η is changed according to the tilt angle. On this assumption, for example, the correction coefficient η is determined to be 0.9 when the angle is eighty degrees (deg), and the correction coefficient η is determined to be 0.8 when the angle is seventy degrees (deg).

In the embodiment mentioned above, the controller 60 (the automatic decelerator 61) determines the deceleration threshold ST(rpm) by changing the correction coefficient η based on an operation of the traveling operation member 59. However, the controller 60 may determine the deceleration threshold ST(rpm) by changing the correction coefficient η in correspondence to a prime mover revolving speed.

The automatic decelerator 61 determines the deceleration threshold ST (rpm) based on Equation (3). The correction coefficient η (rpm) in Equation (3) is a value corresponding to the prime mover revolving speed.

(Equation 3)

$$ST(rpm) = \begin{pmatrix} A1(rpm) \\ A2(rpm) \\ A3(rpm) \\ A4(rpm) \end{pmatrix} \times \eta_{(rpm)} \quad (3)$$

Figure 4:
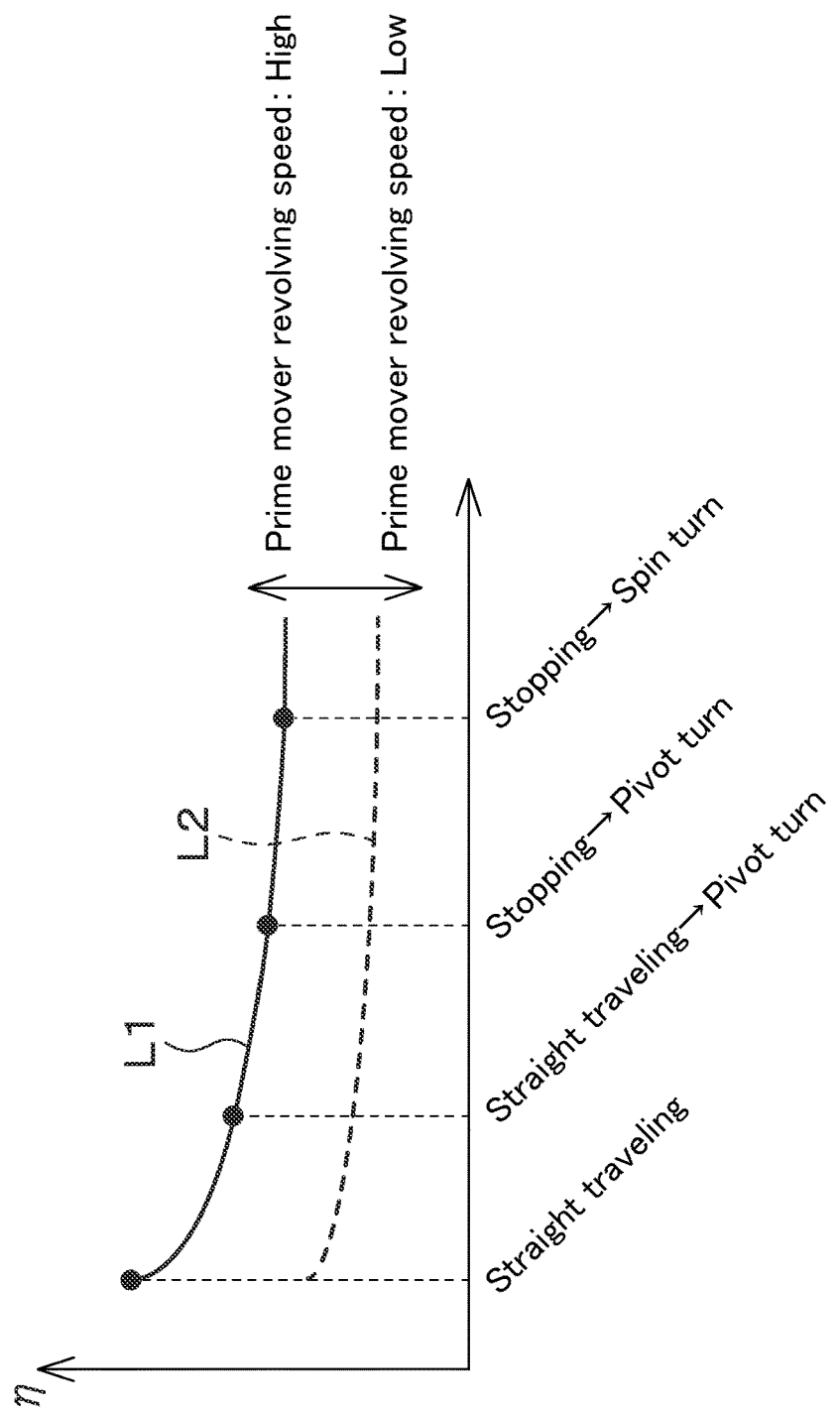
FIG. 4 is a graph showing an example of a relationship between the traveling state of the working machine, a prime mover revolving speed, and a correction coefficient η (rpm).

FIG. 4 shows an example of variation of the correction coefficient η (rpm) related to variation in a state of traveling of the working machine 1 and prime mover revolving speed. A line L1 in FIG. 4 expresses variation of the correction coefficient η (rpm) determined while the prime mover revolving speed is 2400 rpm, and a line L2 expresses variation of the correction coefficient η (rpm) determined while the prime mover revolving speed is 1200 rpm. The automatic decelerator 61 increases the correction coefficient η (rpm) as the prime mover revolving speed increases, and decreases the correction coefficient η (rpm) as the prime mover revolving speed decreases. As shown in FIG. 4, the correction information indicating these relationships between the prime mover revolving speed and the correction coefficient η is stored in the memory 63, and the controller 60 can read out the correction coefficient η from the memory 63 according to the prime mover revolving speed.

In the embodiment mentioned above, the deceleration threshold ST (rpm) is acquired through multiplication with the correction coefficient η. Alternatively, the deceleration threshold value ST (rpm) may be determined by adding or subtracting a reference value a (rpm) to or from a value acquired by multiplying the values A1 (rpm), A2 (rpm), A3 (rpm), and A4 (rpm), which are determined according to the prime mover revolving speed, by the correction coefficient η. Specifically, the controller 60 (the automatic decelerator 61) determines the deceleration threshold ST (rpm) based on Equation (4). The reference value a (rpm) is a value determined in correspondence to the prime mover revolving speed and is previously stored in the memory device 63.

(Equation 4)

$$ST(rpm) = \alpha_{(rpm)} + \begin{pmatrix} A1(rpm) \\ A2(rpm) \\ A3(rpm) \\ A4(rpm) \end{pmatrix} \times \eta_{(rpm)} \quad (4)$$

The controller 60 (the automatic decelerator 61) may set the deceleration threshold ST (rpm) based on a plurality of correction coefficients η. Specifically, the controller 60 (the automatic decelerator 61) determines the deceleration threshold ST(rpm) by multiplying each of the first traveling pressure LF (t, rpm), the second traveling pressure LR (t, rpm), the third traveling pressure RF (t, rpm), and the fourth traveling pressure RR (t, rpm) by a first correction coefficient ηa and a second correction coefficient ηb, as shown in Equation (5).

(Equation 5)

$$ST(rpm) = \begin{pmatrix} LF(t, rpm) \\ LB(t, rpm) \\ RF(t, rpm) \\ RB(t, rpm) \end{pmatrix} \times \eta_a \times \eta_n \quad (5)$$

Figure 5:
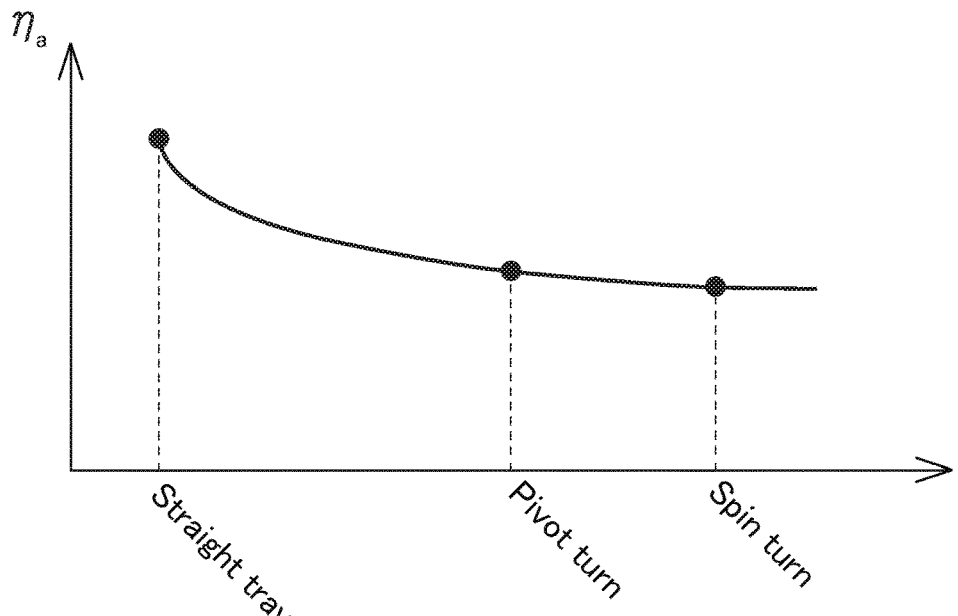
FIG. 5 is a graph showing an example of a relationship between the traveling state of the working machine, a first correction coefficient ηa, and a second correction coefficient ηb.
Figure 5:
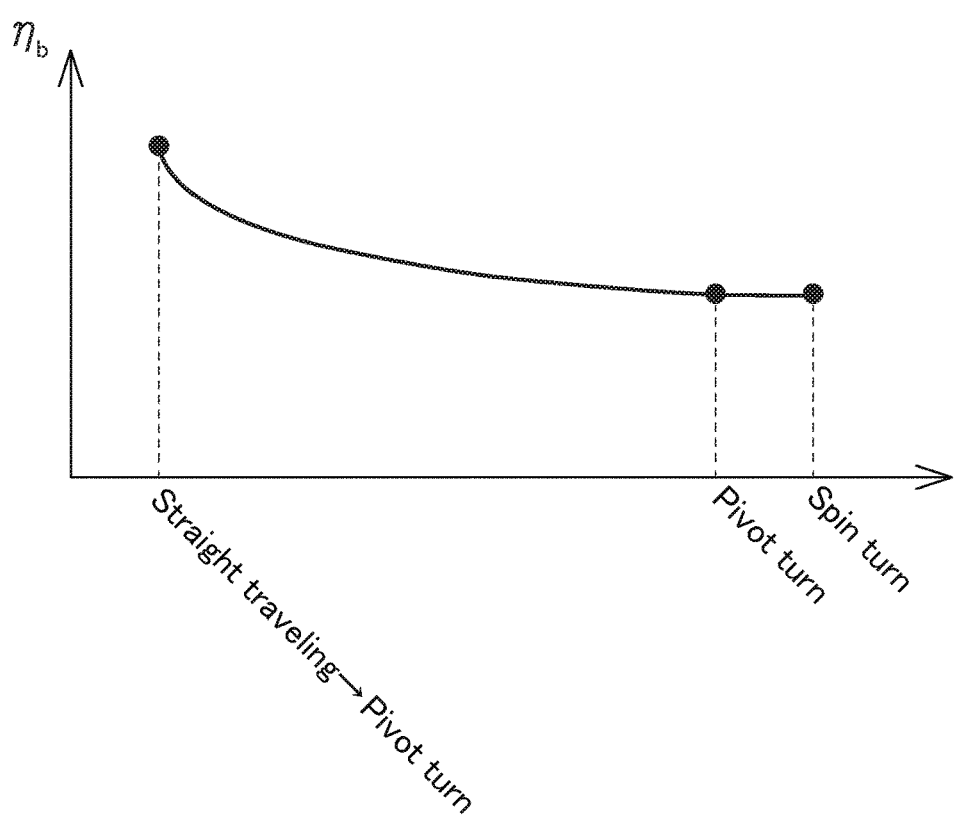

FIG. 5 shows an example of variation of the first correction coefficient ηa and the second correction coefficient ηb related to variation in a state of traveling of the working machine 1. As shown in FIG. 5, the first correction coefficient ηa and the second correction coefficient ηb become their maximum values when the state of traveling shows the straight traveling. The first correction coefficient ηa and the second correction coefficient ηb become their minimum values when the state of traveling shows the spin-turn. When the state of traveling shows the pivot-turn, the first correction coefficient ηa and the second correction coefficient ηb become smaller than those in the straight traveling and larger than those in the spin-turn. In this manner, by determining the deceleration threshold ST (rpm) based on the plurality of correction coefficients η, the automatic deceleration can be precisely performed accurately in correspondence to the states of traveling.

The working machine 1 includes the machine body 2, the prime mover 32 provided on the machine body 2, the left traveling device 5L provided on the left portion of the machine body 2, the right traveling device 5R provided on the right portion of the machine body 2, the left traveling motor 36L configured to output power to the left traveling device 5L and to be rotated at a speed shiftable between the first speed and the second speed higher than the first speed, the right traveling motor 36R configured to output power to the right traveling device 5R and to be rotated at a speed shiftable between the first speed and the second speed higher than the first speed, and the controller 60 configured or programmed to perform the automatic deceleration for automatically decelerating the left traveling motor 36L and the right traveling motor 36R rotated at the second speed by shifting from the second speed to the first speed, and to determine the deceleration threshold ST (rpm) that is used for judging whether the automatic deceleration has to be performed or not. According to this configuration, the automatic deceleration can be changed in correspondence to various states of the working machine 1.

The working machine 1 includes the traveling operation member 59 operable to change rotational directions of the left traveling motor 36L and the right traveling motor 36R. The controller 60 is configured or programmed to change the deceleration threshold ST (rpm) according to an operation of the traveling operation member 59. According to this configuration, the automatic deceleration can be changed in correspondence to the operation of the traveling operation member 59.

The controller 60 is configured or programmed to acquire either a turn correction coefficient or a straight-traveling correction coefficient, the turn correction coefficient being provided for determining the deceleration threshold ST (rpm) when the operation of the traveling operation member 59 corresponds to that for turning of the working machine, the straight-traveling correction coefficient being provided for determining another deceleration threshold ST (rpm) when the operation of the traveling operation member 59 corresponds to that for straight-traveling of the working machine. The controller 60 is configured or programmed to switch the turn correction coefficient to the straight-traveling correction coefficient when the operation of the traveling operation member 59 is changed to that for the straight-traveling. According to this configuration, the working machine 1 is capable of performing the automatic deceleration in the turning of the working machine 1 differently from the automatic deceleration in the straight traveling.

The controller 60 is configured or programmed to change the deceleration threshold ST (rpm) according to a revolving speed of the prime mover 32. According to this configuration, it is easy to determine whether or not to perform the automatic deceleration based on a revolving speed of the prime mover 32.

The working machine includes the first circulation fluid line 57h connected to the first port and the second port of the left traveling pump 53L and connected to the left traveling motor 36L, the second circulation fluid line 57i connected to a third port and a fourth port of the right traveling pump 53R and connected to the right traveling motor 36R, the first pressure detector 80a provided on the portion of the first circulation fluid line 57h connected to the first port of the left traveling motor 36L and configured to detect the first traveling pressure that is a pressure of operation fluid applied to the first circulation fluid line 57h during rotation of the left traveling motor 36L, the second pressure detector 80b provided on the portion of the first circulation fluid line 57h connected to the second port of the left traveling motor 36L and configured to detect the second traveling pressure that is a pressure of operation fluid applied to the first circulation fluid line 57h during rotation of the left traveling motor 36L, the third pressure detector 80c provided on the portion of the second circulation fluid line 57i connected to the third port of the right traveling motor 36R and configured to detect the third traveling pressure that is a pressure of operation fluid applied to the second circulation fluid line 57i during rotation of the right traveling motor 36R, and the fourth pressure detector 80d provided on the portion of the second circulation fluid line 57i connected to the fourth port of the right traveling motor 36R and configured to detect the fourth traveling pressure that is a pressure of operation fluid applied to the second circulation fluid line 57i during rotation of the right traveling motor 36R. The controller 60 is configured or programmed to perform the automatic deceleration based on the determined deceleration threshold and any one of the first traveling pressure, the second traveling pressure, the third traveling pressure, and the fourth traveling pressure in state where the left traveling motor 36L and the right traveling motor 36R are each rotated at the second speed. According to this configuration, the automatic deceleration can be easily performed based on the traveling pressures (that is, the first traveling pressure, the second traveling pressure, the third traveling pressure, and the fourth traveling pressure) and the deceleration threshold.

The controller 60 is configured or programmed to change the deceleration threshold when the operation of the traveling operation member 59 corresponds to that for the turning. According to this configuration, it can be determined smoothly, based on the operation of the traveling operation member 59 for the turning, whether to perform the automatic deceleration or the like.

As described above, the only requirement for the speed stages including the first speed and the second speed is that the second speed is faster than the first speed. Therefore, the speed stages of the working machine 1 are not limited to the two speed stages and may be more than two (that is, multiple speed stages).

In the embodiment mentioned above, the left traveling motor 36L and the right traveling motor 36R are configured so that their common speed stage is simultaneously switched to the first speed stage or the second speed stage, and the automatic deceleration is also performed simultaneously for the left traveling motor 36L and the right traveling motor 36R. However, the automatic deceleration may be performed in a state where a speed stage of at least one of the left traveling motor 36L and the right traveling motor 36R is shiftable between the first speed and the second speed, and the speed stage of the at least one of the left traveling motor 36L and the right traveling motor 36R is set to the second speed.

The traveling motors (that is, the left traveling motor 36L and the right traveling motor 36R) may be either axial piston motors or radial piston motors. Regardless of whether the traveling motors are the radial piston motors or the radial piston motors, the speed stage of the motors can be switched to the first speed by increasing the motor displacements and to the second speed stage by decreasing the motor displacements.

In the embodiment mentioned above, the correction coefficient η is multiplied with each of the pressure values A1 (rpm), A2 (rpm), A3 (rpm) and A4 (rpm) determined according to a revolving speed of the prime mover. Alternatively, any pressure (or its raw value) may serve as the correction coefficient η for determining the deceleration threshold ST (rpm).

Figure 6:
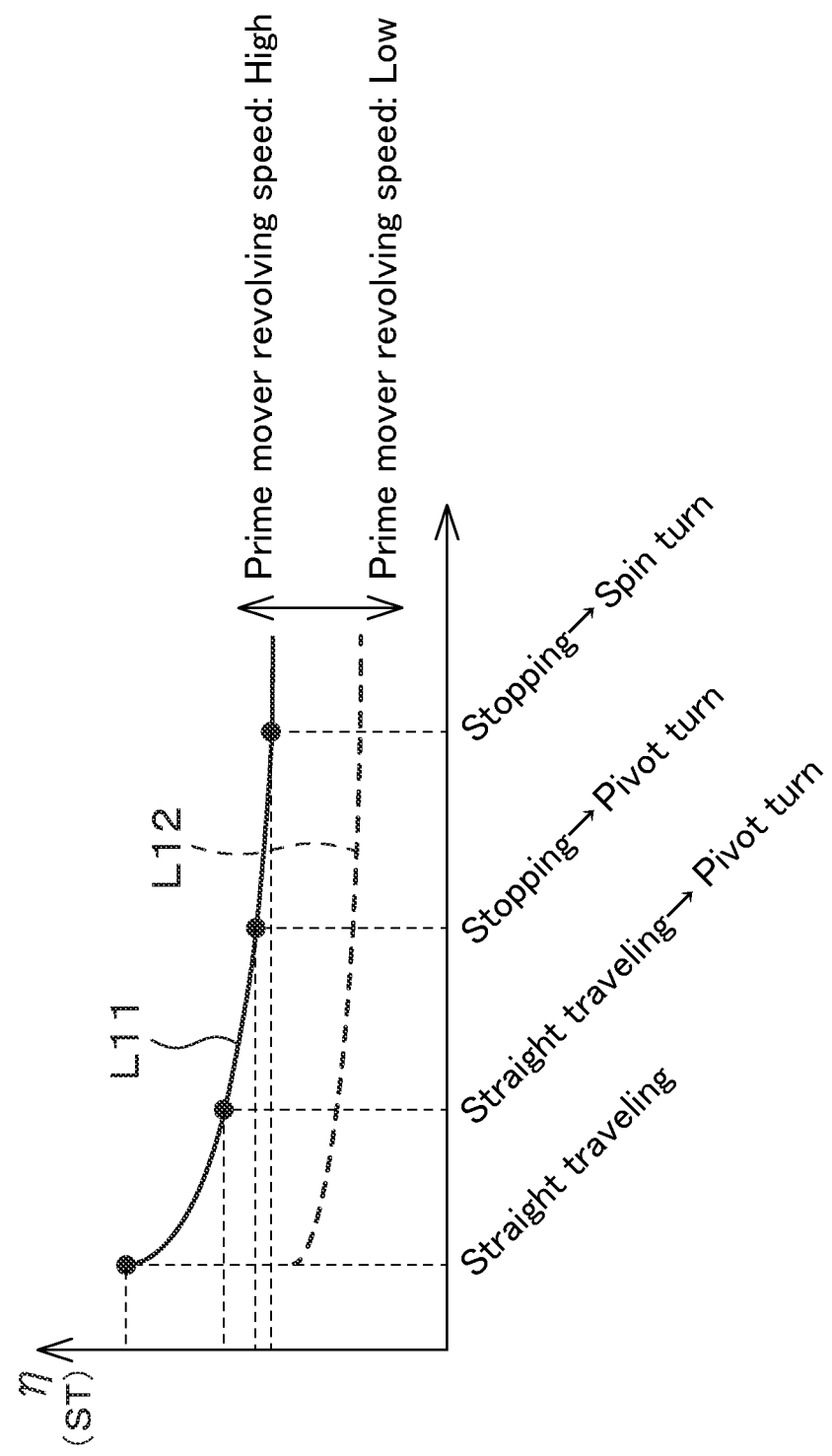
FIG. 6 is a graph showing an example of the correction coefficient η (a deceleration threshold ST (rpm)).

For example, as shown in FIG. 6, the correction coefficient η (the deceleration threshold ST (rpm)) variable according to an operation of the operation member 59 and according to variation in a revolving speed of the prime mover is acquired based on the lines L11 and L12. The correction coefficient η (the deceleration threshold ST (rpm)) becomes larger as the prime mover revolving speed increases, and becomes smaller as the prime mover revolving speed decreases.

In the embodiment mentioned above, as shown in FIGS. 4 and 6, the deceleration thresholds ST (rpm) acquired in Equations (2) to (5) are increased by increasing the correction coefficient η with increase of the actual prime mover revolving speed (referred to as an actual prime mover revolving speed).

Figure 7:
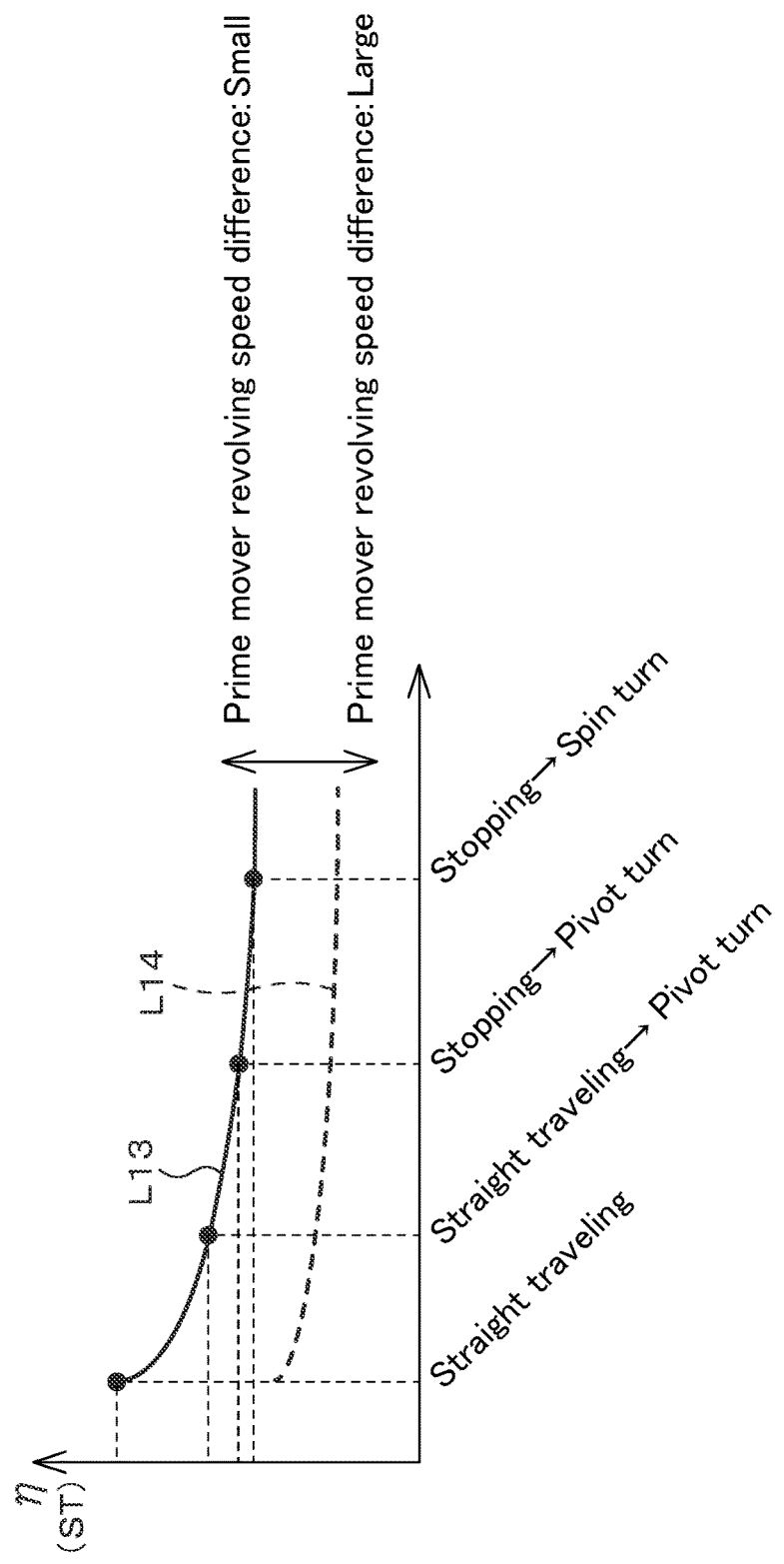
FIG. 7 is a graph showing an example of the correction coefficient η (the deceleration threshold ST (rpm)) based on a prime mover revolving speed difference.

However, another method shown in FIG. 7 may be adopted. FIG. 7 shows an example of the correction coefficient η (rpm) determined based on a prime mover revolving speed difference.

As shown in FIG. 7, the correction coefficient η may be changed along a lines L13 or L14 according to a difference (referred to as a prime mover revolving speed difference) between an actual prime mover revolving speed and a target revolving speed of the prime mover (referred to as a target prime mover revolving speed) that is based on a command according to an operation of the accelerator 65 or the like. The target prime mover revolving speed is a predetermined revolving speed (that is, a prime mover revolving speed) corresponding to an opening degree of the accelerator 65 or the like. As shown in FIG. 7, the correction coefficient η is made small when the prime mover revolving speed difference is large, and the correction coefficient η is made large when the prime mover revolving speed difference is small. In this manner, the deceleration threshold ST (rpm) acquired in Equations (2) to (5) may be increased by increasing the correction coefficient η according to reduction of the prime mover revolving speed difference.

In the embodiment mentioned above, the deceleration threshold ST (rpm) is a value acquired by using Equations (2) to (5) with the correction coefficient η or the like. Thus, the deceleration threshold ST (rpm) also changes in the same manner as the lines L11 and L12 shown in FIG. 6 and the lines L13 and L14 shown in FIG. 7 in correspondence to variation in the traveling state of the working machine 1. Thus, by plotting the variation of the deceleration threshold ST (rpm) relative to the variation in the traveling state of the working machine 1, lines corresponding to the lines L11 and L12 shown in FIG. 6 and the lines L13 and L14 shown in FIG. 7 can be acquired as those expressing variation of the deceleration threshold ST (rpm).

That is, by reading the vertical axes of the graphs shown in FIGS. 6 and 7 as the deceleration threshold ST (rpm) instead of the correction coefficient η, a graph showing the variation of the deceleration threshold ST (rpm) relative to variation in the traveling state of the working machine 1, that is, a graph showing characteristics of the deceleration threshold ST (rpm), can be acquired.

The controller 60 may be previously provided with a map expressing the variation of the deceleration threshold ST (rpm) relative to variation in the traveling state of the working machine 1, the changing corresponding to the graph.

In the embodiment mentioned above, the operation device 54 is a hydraulic device that changes a pilot pressure applied to the traveling pumps (that is, the traveling pumps 53L and 53R) with the operation member 59 and the operation valve 55. However, the operation performed by the operation device 54 according to the embodiment mentioned above can be realized by employing an electrically operable joystick, the controller 60, and a hydraulic regulator that changes angles of the swash plates of the traveling pumps. This joystick-based configuration also enables smooth performance of the automatic deceleration by using the above-described deceleration threshold ST (rpm). The configuration using the joystick is described below.

The joystick, which is a replacement for the operation lever 59, is an operation lever swingable in the left-and-right direction (that is, the machine width direction) or the fore-and-aft direction. The joystick includes a sensor (referred to as an operation detection sensor) configured to detect an operation amount (that is, a swing amount) thereof and an operational direction (that is, a swing direction) thereof. The operation detection sensor is connected to the controller 60.

The hydraulic regulators that operate the swash plates of the traveling pumps (that is, the traveling pumps 53L and 53R) are connected to the controller 60. The hydraulic regulators are connected respectively to the swash plate of the traveling pump 53L and the swash plate of the traveling pump 53R. Accordingly, the swash plate of the traveling pump 53L and the swash plate of the traveling pump 53R can be controlled independently of each other.

When the joystick is operated forward, the controller 60 outputs, to the hydraulic regulators, a control signal corresponding to an operation amount of the joystick. In response to the control signal, the hydraulic regulators turn the swash plates of the traveling pump 53L and the traveling pump 53R in respective directions to rotate the traveling motors 36L and 36R normally (i.e., forward). In this manner, the working machine 1 travels forward.

When the joystick is operated backward, the controller 60 outputs, to the hydraulic regulators, a control signal corresponding to an operation amount of the joystick. In response to the control signal, the hydraulic regulators turn the swash plates of the traveling pump 53L and the traveling pump 53R in respective directions to rotate the traveling motors 36L and 36R reversely (i.e., backward). In this manner, the working machine 1 travels backward.

When the joystick is operated rightward, the controller 60 outputs, to the hydraulic regulators, a control signal corresponding to an operation amount of the joystick. In response to the control signal, one hydraulic regulator turns the swash plate of the traveling pump 53L in the direction to rotate the traveling motor 36L normally, and the other hydraulic regulator turns the swash plate of the traveling pump 53R in the direction to rotate the traveling motor 36R reversely. In this manner, the working machine 1 turns rightward.

When the joystick is operated leftward, the controller 60 outputs, to the hydraulic regulators, a control signal corresponding to an operation amount of the joystick. In response to the control signal, one hydraulic regulator turns the swash plate of the traveling pump 53L in the direction to rotate the traveling motor 36L reversely, and the other hydraulic regulator turns the swash plate of the traveling pump 53R in the direction to rotate the traveling motor 36R normally. In this manner, the working machine 1 turns leftward.

A state of traveling of the working machine 1 can be detected in the configuration in which the swash plates of the traveling pumps are turned according to a control signal issued by the joystick instead of the hydraulic system for changing the pilot pressures. When the correction coefficient η is changed according to the state of the working machine 1 detected by the configuration with the joystick, the deceleration threshold ST (rpm) can be determined due to the above-mentioned configuration in the present embodiment.

Figure 8:
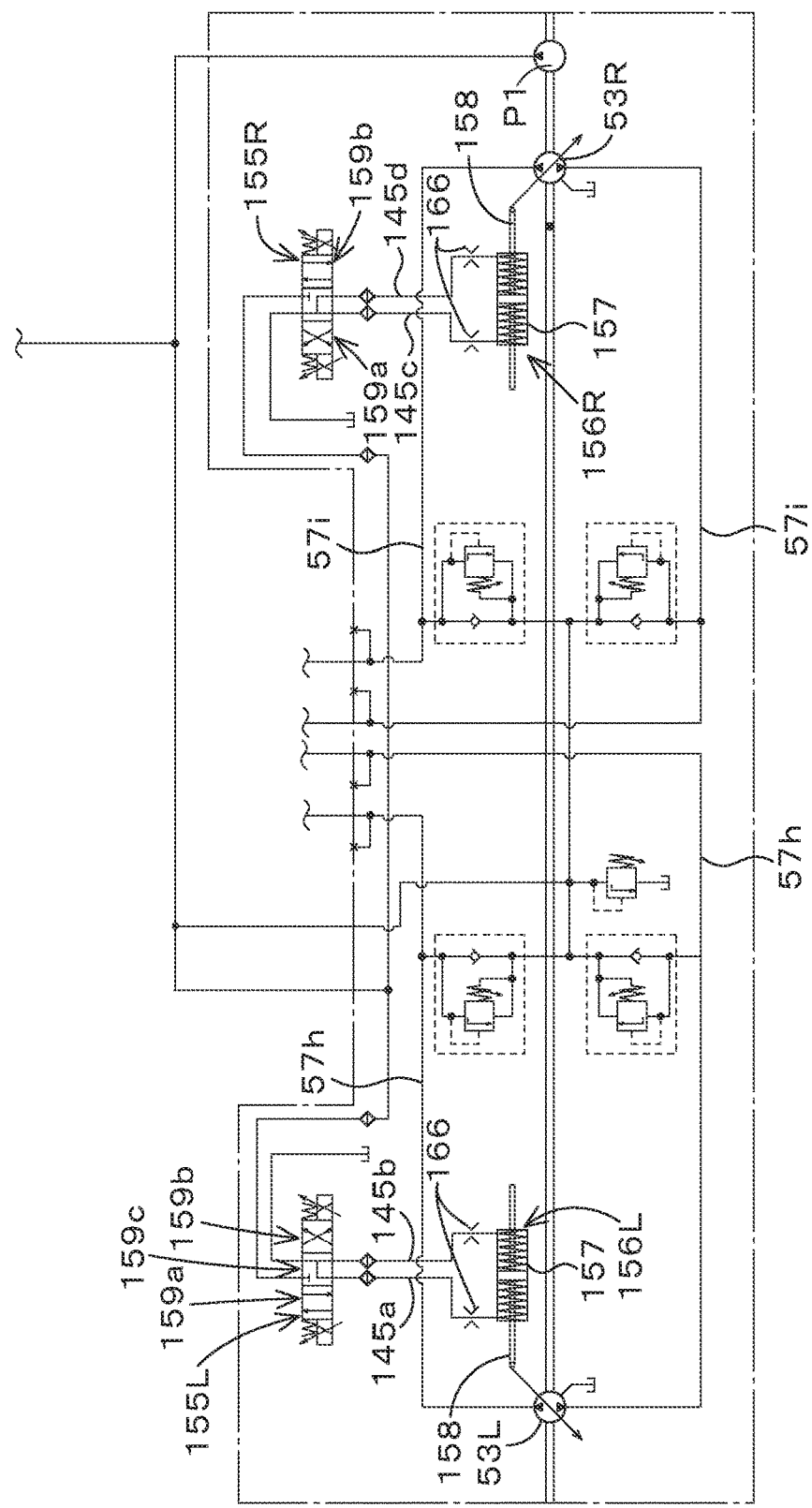
FIG. 8 is a diagram of another hydraulic system (another hydraulic circuit) for the working machine.

Moreover, operation valves 155L and 155R and hydraulic regulators 156L and 156R shown in FIG. 8 may be employed. In the operation valves 155L and 155R, shift positions and opening degrees of the valves are also controlled based on a control signal output from the controller 60 in response to the operation of the operating lever 59. The operation valves 155L and 155R include solenoid proportional valves. The controller 60 controls the operation valves 155L and 155R, thereby operating the hydraulic regulators 156L and 156R.

As shown in FIG. 8, the hydraulic regulators 156L and 156R are connected respectively to the swash plates of the traveling pumps (that is, the traveling pump 53L and the traveling pump 53R). Each of the hydraulic regulators 156L and 156R is capable of changing each of the angles of swash plates (that is, swash plate angles) of the traveling pumps (that is, the traveling pump 53L and the traveling pump 53R), and includes a supply chamber 157, to which operation fluid is supplied, and a piston rod 158 provided in the supply chamber 157. The piston rod 158 is connected to the swash plate, and the movement (that is, extending and contracting) of the piston rod 158 causes the swash plate to turn, thereby changing the swash plate angle.

The operation valve 155L directly operates the hydraulic regulator 156L, and controls an operation fluid delivery amount of the traveling pump 53L by operating the hydraulic regulator 156L. The operation valve 155L includes a solenoid proportional valve having a solenoid, and a spool of the operation valve 155L moves according to a control signal output from the controller 60 to the solenoid. This movement of the spool changes an opening degree of the operation valve 155L. The operation valve 155L has a first position 159a, a second position 159b, and a neutral position 159c, and is shiftable among the positions.

The first port of the operation valve 155L is connected to the supply chamber 157 of the hydraulic regulator 156L by the first traveling fluid line 145a. The second port of the operation valve 155L is connected to the supply chamber 157 of the hydraulic regulator 156L by the second traveling fluid line 145b.

The operation valve 155R directly operates the hydraulic regulator 156R and controls an operation fluid delivery amount of the second traveling pump 53R by operating the hydraulic regulator 156R. The operation valve 155R includes a solenoid proportional valve having a solenoid, and a spool of the operation valve 155R moves according to a control signal output from the controller 60 to the solenoid. This movement of the spool changes an opening degree of the operation valve 155R. The operation valve 155R has a first position 159a, a second position 159b, and a neutral position 159c, and is shiftable among the positions.

The first port of the operation valve 155R is connected to the supply chamber 157 of the hydraulic regulator 156R by the third traveling fluid line 145c. The second port of the operation valve 155R is connected to the supply chamber 157 of the hydraulic regulator 156R by the fourth traveling fluid line 145d.

When the operation valve 155L and the operation valve 155R are each switched to the first position 159a, the hydraulic regulators 156L and 156R are actuated to swing the swash plates of the traveling pumps (that is, the traveling pump 53L and the traveling pump 53R), whereby the traveling pumps deliver operation fluid in respective directions to rotate the traveling motors normally. When the operation valve 155L and the operation valve 155R are switched to the second position 159b, the hydraulic regulators 156L and 156R are actuated to turn the swash plates of the traveling pumps (that is, the first traveling pump 53L and the second traveling pump 53R), whereby the traveling pumps deliver operation fluid in the respective directions to rotate the traveling motors reversely.

When the operation valve 155L is switched to the first position 159a and the operation valve 155R is switched to the second position 159b, the traveling pump 53L delivers operation fluid in the direction to rotate the traveling motor 36L normally, and the traveling pump 53R delivers operation fluid in the direction to rotate the traveling motor 36R reversely. When the operation valve 155L is switched to the second position 159b and the operation valve 155R is switched to the first position 159a, the traveling pump 53L delivers operation fluid in the direction to rotate the traveling motor 36L reversely, and the traveling pump 53R delivers operation fluid in the direction to rotate the traveling motor 36R normally.

Due to the configuration with the joystick issuing a control signal to turn the swash plates of the traveling pumps, a state of traveling of the working machine 1 can be detected even while the configuration includes the operation valves 155L and 155R and the hydraulic regulators 156L and 156R to turn the swash plates of the traveling pumps. Therefore, the configuration with the joystick according to the present embodiment enables the deceleration threshold ST (rpm) to be determined only if the correction coefficient η is changed according to the state of traveling of the working machine 1 detected by the configuration with the joystick.

The configuration with the electrically acting joystick enables the automatic deceleration to be performed in the manner similar to the configuration with the hydraulic operation valves 55. When the return condition is satisfied after the automatic deceleration is performed, the automatic decelerator 61 magnetizes the solenoid of the second switching valve 72 to switch the second switching valve 72 from the first position 72a to the second position 72b, thereby shifting from the first speed to the second speed to accelerate the traveling motors (that is, the left traveling motor 36L and the right traveling motor 36R), that is, to restore the preceding speed stage of the traveling motors. Briefly, the controller 60, when performing the return from the first speed to the second speed, accelerates both of the left traveling motor 36L and the right traveling motor 36R by shifting the speed stage of the traveling motors from the first speed to the second speed.

One of the return conditions is that, in the configuration including the hydraulic operation valves 55 (that is, the traveling operation member 59), the controller 60 determines that all of the pilot pressures of the first to fourth traveling fluid lines 45a to 45d have certain values or less, and further determines that the traveling operation member 59 is set at the neutral position. Briefly, when the controller 60 detects that all of the pilot pressures of the first to fourth traveling fluid lines 45a to 45d are the certain values or less during the automatic deceleration, the controller 60 determines that the traveling operation member 59 is set at the neutral position and performs the returning from the automatic deceleration.

Another return condition is that, in the configuration including the electrically acting joystick, the controller 60 determines that an operation amount (that is, a swing amount) and operational direction (that is, a swing direction) of the joystick detected by sensors (that is, operation detection sensors) indicate that the joystick is set at the neutral position. Briefly, when the controller 60 determines that the joystick is set at the neutral position during the automatic deceleration, the controller 60 performs the returning from the automatic deceleration.

It should be considered that the embodiments disclosed in this application are exemplary in all respects and not restrictive. The scope of the present invention is shown not by the above description but by the scope of claims, and it is intended that all modifications within the meaning and scope equivalent to the scope of claims are included.

The invention claimed is:

1. A working machine comprising:
a machine body;
a prime mover provided on the machine body;
a left traveling device provided on a left portion of the machine body;
a right traveling device provided on a right portion of the machine body;
a left traveling motor configured to output power to the left traveling device and to be rotated at a speed shiftable between a first speed and a second speed higher than the first speed;
a right traveling motor configured to output power to the right traveling device and to be rotated at a speed shiftable between the first speed and the second speed higher than the first speed; and
a controller configured or programmed to perform an automatic deceleration for automatically decelerating the left traveling motor and the right traveling motor rotated at the second speed by shifting from the second speed to the first speed, and to determine a deceleration threshold that is used for judging whether the automatic deceleration has to be performed or not; and
a traveling operation member operable to change rotational directions of the left traveling motor and the right traveling motor, wherein
the controller is configured or programmed to change the deceleration threshold according to an operation of the traveling operation member,
the controller is configured or programmed to acquire either a turn correction coefficient or a straight-traveling correction coefficient, the turn correction coefficient being provided for determining a deceleration threshold when the operation of the traveling operation member corresponds to that for turning of the working machine, the straight-traveling correction coefficient being provided for determining another deceleration threshold when the operation of the traveling operation member machine, and
the controller is configured or programmed to switch the turn correction coefficient to the straight-traveling correction coefficient when the operation of the traveling operation member is changed to that for the straight-traveling.

2. The working machine according to claim 1, wherein the controller is configured or programmed to change the deceleration threshold according to a revolving speed of the prime mover.

3. The working machine according to claim 2, further comprising:
a first circulation fluid line connected to a first port and a second port of a left traveling pump and connected to the left traveling motor;
a second circulation fluid line connected to a third port and a fourth port of a right traveling pump and connected to the right traveling motor;
a first pressure detector provided on a portion of the first circulation fluid line connected to a first port of the left traveling motor and configured to detect a first traveling pressure that is a pressure of operation fluid applied to the first circulation fluid line during rotation of the left traveling motor;
a second pressure detector provided on another portion of the first circulation fluid line connected to a second port of the left traveling motor and configured to detect a second traveling pressure that is a pressure of operation fluid applied to the first circulation fluid line during rotation of the left traveling motor;
a third pressure detector provided on a portion of the second circulation fluid line connected to a third port of the right traveling motor and configured to detect a third traveling pressure that is a pressure of operation fluid applied to the second circulation fluid line during rotation of the right traveling motor; and
a fourth pressure detector provided on another portion of the second circulation fluid line connected to a fourth port of the right traveling motor and configured to detect a fourth traveling pressure that is a pressure of operation fluid applied to the second circulation fluid line during rotation of the right traveling motor, wherein
the controller is configured or programmed to perform the automatic deceleration based on the determined deceleration threshold and any one or more of the first traveling pressure, the second traveling pressure, the third traveling pressure, and the fourth traveling pressure in a state where the left traveling motor and the right traveling motor are each rotated at the second speed.

4. The working machine according to claim 1, wherein the controller is configured or programmed to change the deceleration threshold according to a difference between a revolving speed of the prime mover and a predetermined revolving speed.

5. The working machine according to claim 4, further comprising:
a first circulation fluid line connected to a first port and a second port of a left traveling pump and connected to the left traveling motor;
a second circulation fluid line connected to a third port and a fourth port of a right traveling pump and connected to the right traveling motor;
a first pressure detector provided on a portion of the first circulation fluid line connected to a first port of the left traveling motor and configured to detect a first traveling pressure that is a pressure of operation fluid applied to the first circulation fluid line during rotation of the left traveling motor;
a second pressure detector provided on another portion of the first circulation fluid line connected to a second port of the left traveling motor and configured to detect a second traveling pressure that is a pressure of operation fluid applied to the first circulation fluid line during rotation of the left traveling motor;
a third pressure detector provided on a portion of the second circulation fluid line connected to a third port of the right traveling motor and configured to detect a third traveling pressure that is a pressure of operation fluid applied to the second circulation fluid line during rotation of the right traveling motor; and a fourth pressure detector provided on another portion of the second circulation fluid line connected to a fourth port of the right traveling motor and configured to detect a fourth traveling pressure that is a pressure of operation fluid applied to the second circulation fluid line during rotation of the right traveling motor, wherein the controller is configured or programmed to perform the automatic deceleration based on the determined deceleration threshold and any one or more of the first traveling pressure, the second traveling pressure, the third traveling pressure, and the fourth traveling pressure in a state where the left traveling motor and the right traveling motor are each rotated at the second speed.

6. The working machine according to claim 1, further comprising:

a first circulation fluid line connected to a first port and a second port of a left traveling pump and connected to the left traveling motor;

a second circulation fluid line connected to a third port and a fourth port of a right traveling pump and connected to the right traveling motor;

a first pressure detector provided on a portion of the first circulation fluid line connected to a first port of the left traveling motor and configured to detect a first traveling pressure that is a pressure of operation fluid applied to the first circulation fluid line during rotation of the left traveling motor;

a second pressure detector provided on another portion of the first circulation fluid line connected to a second port of the left traveling motor and configured to detect a second traveling pressure that is a pressure of operation fluid applied to the first circulation fluid line during rotation of the left traveling motor;

a third pressure detector provided on a portion of the second circulation fluid line connected to a third port of the right traveling motor and configured to detect a third traveling pressure that is a pressure of operation fluid applied to the second circulation fluid line during rotation of the right traveling motor; and a fourth pressure detector provided on another portion of the second circulation fluid line connected to a fourth port of the right traveling motor and configured to detect a fourth traveling pressure that is a pressure of operation fluid applied to the second circulation fluid line during rotation of the right traveling motor, wherein the controller is configured or programmed to perform the automatic deceleration based on the determined deceleration threshold and any one or more of the first traveling pressure, the second traveling pressure, the third traveling pressure, and the fourth traveling pressure in a state where the left traveling motor and the right traveling motor are each rotated at the second speed.

7. The working machine according to claim 1, wherein the controller is configured or programmed to change the deceleration threshold when the operation of the traveling operation member corresponds to that for turning of the working machine.

8. A working machine comprising:

a machine body;

a prime mover provided on the machine body;

a left traveling device provided on a left portion of the machine body;

a right traveling device provided on a right portion of the machine body;

a left traveling motor configured to output power to the left traveling device and to be rotated at a speed shiftable between a first speed and a second speed higher than the first speed;

a right traveling motor configured to output power to the right traveling device and to be rotated at a speed shiftable between the first speed and the second speed higher than the first speed;

a controller configured or programmed to perform an automatic deceleration for automatically decelerating the left traveling motor and the right traveling motor rotated at the second speed by shifting from the second speed to the first speed, and to determine a deceleration threshold that is used for judging whether the automatic deceleration has to be performed or not;

a first circulation fluid line connected to a first port and a second port of a left traveling pump and connected to the left traveling motor;

a second circulation fluid line connected to a third port and a fourth port of a right traveling pump and connected to the right traveling motor;

a first pressure detector provided on a portion of the first circulation fluid line connected to a first port of the left traveling motor and configured to detect a first traveling pressure that is a pressure of operation fluid applied to the first circulation fluid line during rotation of the left traveling motor;

a second pressure detector provided on another portion of the first circulation fluid line connected to a second port of the left traveling motor and configured to detect a second traveling pressure that is a pressure of operation fluid applied to the first circulation fluid line during rotation of the left traveling motor;

a third pressure detector provided on a portion of the second circulation fluid line connected to a third port of the right traveling motor and configured to detect a third traveling pressure that is a pressure of operation fluid applied to the second circulation fluid line during rotation of the right traveling motor; and a fourth pressure detector provided on another portion of the second circulation fluid line connected to a fourth port of the right traveling motor and configured to detect a fourth traveling pressure that is a pressure of operation fluid applied to the second circulation fluid line during rotation of the right traveling motor, wherein the controller is configured or programmed to perform the automatic deceleration based on the determined deceleration threshold and any one or more of the first traveling pressure, the second traveling pressure, the third traveling pressure, and the fourth traveling pressure in a state where the left traveling motor and the right traveling motor are each rotated at the second speed.

9. The working machine according to claim 8, further comprising a traveling operation member operable to change rotational directions of the left traveling motor and the right traveling motor, wherein the controller is configured or programmed to change the deceleration threshold according to an operation of the traveling operation member.

10. The working machine according to claim 9, wherein the controller is configured or programmed to, after starting the automatic deceleration, when the traveling operation member is in a neutral position, switch a speed stage of the left traveling motor and the right traveling motor from the first speed to the second speed.

11. The working machine according to claim 8, wherein the controller is configured or programmed to, after starting the automatic deceleration, switch a speed stage of the left traveling motor and the right traveling motor from the first speed to the second speed based on a return threshold and any one or more of the first traveling pressure, the second traveling pressure, the third traveling pressure, and the fourth traveling pressure.

12. A working machine comprising:
a machine body;
a prime mover provided on the machine body;
a left traveling device provided on a left portion of the machine body;
a right traveling device provided on a right portion of the machine body;
a left traveling motor configured to output power to the left traveling device and to be rotated at a speed shiftable between a first speed and a second speed higher than the first speed;
a right traveling motor configured to output power to the right traveling device and to be rotated at a speed shiftable between the first speed and the second speed higher than the first speed;
a controller configured or programmed to perform an automatic deceleration for automatically decelerating the left traveling motor and the right traveling motor rotated at the second speed by shifting from the second speed to the first speed, and to determine a deceleration threshold that is used for judging whether the automatic deceleration has to be performed or not; and
a traveling operation member operable to change rotational directions of the left traveling motor and the right traveling motor, wherein
the controller is configured or programmed to change the deceleration threshold according to an operation of the traveling operation member and a revolving speed of the prime mover.

13. The working machine according to claim 12, further comprising:
a first circulation fluid line connected to a first port and a second port of a left traveling pump and connected to the left traveling motor;
a second circulation fluid line connected to a third port and a fourth port of a right traveling pump and connected to the right traveling motor;
a first pressure detector provided on a portion of the first circulation fluid line connected to a first port of the left traveling motor and configured to detect a first traveling pressure that is a pressure of operation fluid applied to the first circulation fluid line during rotation of the left traveling motor;
a second pressure detector provided on another portion of the first circulation fluid line connected to a second port of the left traveling motor and configured to detect a second traveling pressure that is a pressure of operation fluid applied to the first circulation fluid line during rotation of the left traveling motor;
a third pressure detector provided on a portion of the second circulation fluid line connected to a third port of the right traveling motor and configured to detect a third traveling pressure that is a pressure of operation fluid applied to the second circulation fluid line during rotation of the right traveling motor; and
a fourth pressure detector provided on another portion of the second circulation fluid line connected to a fourth port of the right traveling motor and configured to detect a fourth traveling pressure that is a pressure of operation fluid applied to the second circulation fluid line during rotation of the right traveling motor, wherein
the controller is configured or programmed to perform the automatic deceleration based on the determined deceleration threshold and any one or more of the first traveling pressure, the second traveling pressure, the third traveling pressure, and the fourth traveling pressure in a state where the left traveling motor and the right traveling motor are each rotated at the second speed.

14. The working machine according to claim 12, further comprising:
a rotation detector to detect an actual revolving speed of the prime mover; and
an accelerator to issue a command of a target revolving speed of the prime mover, wherein
the controller is configured or programmed to change the deceleration threshold according to the operation of the traveling operation member and a difference between the revolving speed revolving speed of the prime mover and the target revolving speed.

15. The working machine according to claim 14, further comprising:
a first circulation fluid line connected to a first port and a second port of a left traveling pump and connected to the left traveling motor;
a second circulation fluid line connected to a third port and a fourth port of a right traveling pump and connected to the right traveling motor;
a first pressure detector provided on a portion of the first circulation fluid line connected to a first port of the left traveling motor and configured to detect a first traveling pressure that is a pressure of operation fluid applied to the first circulation fluid line during rotation of the left traveling motor;
a second pressure detector provided on another portion of the first circulation fluid line connected to a second port of the left traveling motor and configured to detect a second traveling pressure that is a pressure of operation fluid applied to the first circulation fluid line during rotation of the left traveling motor;
a third pressure detector provided on a portion of the second circulation fluid line connected to a third port of the right traveling motor and configured to detect a third traveling pressure that is a pressure of operation fluid applied to the second circulation fluid line during rotation of the right traveling motor; and
a fourth pressure detector provided on another portion of the second circulation fluid line connected to a fourth port of the right traveling motor and configured to detect a fourth traveling pressure that is a pressure of operation fluid applied to the second circulation fluid line during rotation of the right traveling motor, wherein
the controller is configured or programmed to perform the automatic deceleration based on the determined deceleration threshold and any one or more of the first traveling pressure, the second traveling pressure, the third traveling pressure, and the fourth traveling pressure in a state where the left traveling motor and the right traveling motor are each rotated at the second speed.

16. A working machine comprising:
a machine body;
a prime mover provided on the machine body;
a left traveling device provided on a left portion of the machine body;
a right traveling device provided on a right portion of the machine body;
a left traveling motor configured to output power to the left traveling device and to be rotated at a speed shiftable between a first speed and a second speed higher than the first speed;
a right traveling motor configured to output power to the right traveling device and to be rotated at a speed shiftable between the first speed and the second speed higher than the first speed;
a controller configured or programmed to perform an automatic deceleration for automatically decelerating the left traveling motor and the right traveling motor rotated at the second speed by shifting from the second speed to the first speed, and to determine a deceleration threshold that is used for judging whether the automatic deceleration has to be performed or not; and
a traveling operation member operable to change rotational directions of the left traveling motor and the right traveling motor, wherein
the controller is configured or programmed to change the deceleration threshold according to an operation of the traveling operation member, and
the controller is configured or programmed to determine the deceleration threshold such that the deceleration threshold differs between when the operation of the traveling operation member is a straight-travel operation for straight-traveling of the working machine and when the operation of the traveling operation member is a turn operation for turning of the working machine.

17. The working machine according to claim 16, wherein the controller is configured or programmed to determine the deceleration threshold such that the deceleration threshold is lower when the operation of the traveling operation member is the turn operation than when the operation of the traveling operation member is the straight-travel operation.

18. The working machine according to claim 16, wherein the controller is configured or programmed to determine the deceleration threshold such that the deceleration threshold differs between when the turn operation of the traveling operation member is a first turn operation to cause the working machine which is traveling straight to perform a pivot turn, when the turn operation of the traveling operation member is a second turn operation to cause the working machine which is in a stopping state to perform a pivot turn, and when the turn operation of the traveling operation member is a third turn operation to cause the working machine which is in the stopping state to perform a spin turn.

19. The working machine according to claim 18, wherein the controller is configured or programmed to determine the deceleration threshold such that the deceleration threshold is lower when the turn operation of the traveling operation member is the second turn operation than when the turn operation of the traveling operation member is the first turn operation, and cause the deceleration threshold to be lower when the turn operation of the traveling operation member is the third turn operation than when the turn operation of the traveling operation member is the second turn operation.

* * * * *